US011050359B2

United States Patent
Chen et al.

(10) Patent No.: US 11,050,359 B2
(45) Date of Patent: Jun. 29, 2021

(54) SINGLE-STAGE MULTI-INPUT BUCK TYPE LOW-FREQUENCY LINK'S INVERTER WITH AN EXTERNAL PARALLEL-TIMESHARING SELECT SWITCH

(71) Applicant: Qingdao University, Qingdao (CN)

(72) Inventors: Daolian Chen, Qingdao (CN); Hanchao Zeng, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 77 days.

(21) Appl. No.: 16/622,277

(22) PCT Filed: Dec. 6, 2018

(86) PCT No.: PCT/CN2018/000408
§ 371 (c)(1),
(2) Date: Dec. 12, 2019

(87) PCT Pub. No.: WO2019/136574
PCT Pub. Date: Jul. 18, 2019

(65) Prior Publication Data
US 2020/0144934 A1    May 7, 2020

(30) Foreign Application Priority Data
Jan. 9, 2018  (CN) .......................... 201810020148.X

(51) Int. Cl.
*H02M 7/5387* (2007.01)
*H02M 1/12* (2006.01)
(Continued)

(52) U.S. Cl.
CPC ......... *H02M 7/53871* (2013.01); *H02J 3/381* (2013.01); *H02M 1/126* (2013.01);
(Continued)

(58) Field of Classification Search
CPC ............. H02M 7/53871; H02M 1/126; H02M 3/3353; H02M 7/53803; H02M 3/155; H02M 7/538; H02J 3/381
See application file for complete search history.

(56) References Cited

U.S. PATENT DOCUMENTS

2018/0269782 A1*  9/2018  Mondal ................ H02J 7/0063

FOREIGN PATENT DOCUMENTS

| CN | 1348248 A | 5/2002 |
| CN | 101534059 A | 9/2009 |
| CN | 108111045 A | 6/2018 |

\* cited by examiner

*Primary Examiner* — Rexford N Barnie
*Assistant Examiner* — Elim Oritz
(74) *Attorney, Agent, or Firm* — Bayramoglu Law Offices LLC

(57) ABSTRACT

A circuit structure of a voltage type single-stage multi-input low-frequency link inverter with an external parallel-timesharing select switch is formed by connecting a plurality of input filters connected to ground and a common output low-frequency isolation voltage-transformation filter circuit through a multi-input single-output high-frequency inverter circuit. Each input end of the multi-input single-output high-frequency inverter circuit is connected to an output end of each of the input filters in a manner of one-to-one correspondence. An output end of the multi-output single-input high-frequency inverter circuit and the output low-frequency isolation voltage-transformation filter circuit are connected. The multi-input single-output high-frequency inverter circuit includes an external multi-path parallel-timesharing select four-quadrant power switch circuit and a bidirectional power flow single-input single-output high-frequency inverter circuit successively connected in cascade.

2 Claims, 13 Drawing Sheets

(51) Int. Cl.
  *H02J 3/38* (2006.01)
  *H02M 3/335* (2006.01)
  *H02M 7/538* (2007.01)
  H02M 1/00 (2006.01)
  H02M 7/48 (2007.01)

(52) U.S. Cl.
  CPC ..... *H02M 3/3353* (2013.01); *H02M 7/53806* (2013.01); *H02J 2300/24* (2020.01); *H02J 2300/28* (2020.01); *H02J 2300/30* (2020.01); *H02M 2001/007* (2013.01); *H02M 2007/4822* (2013.01)

SINGLE-STAGE MULTI-INPUT BUCK TYPE LOW-FREQUENCY LINK'S INVERTER WITH AN EXTERNAL PARALLEL-TIMESHARING SELECT SWITCH

CROSS REFERENCE TO THE RELATED APPLICATIONS

This application is the national phase entry of International Application No. PCT/CN2018/000408, filed on Dec. 6, 2018, which is based upon and claims priority to Chinese Patent Application No. 201810020148.X, filed on Jan. 9, 2018, the entire contents of which are incorporated herein by reference.

TECHNICAL FIELD

The present disclosure relates to a single-stage multi-input buck type low-frequency link's inverter with an external parallel-timesharing select switch and belongs to the technology of power electronic conversion.

BACKGROUND

The inverter is a static converter for converting an unstable and inferior direct current (DC) electrical power to a stable and superior alternating current (AC) electrical power by using power semiconductor devices, which supplies an AC load or realizes an AC grid-tied transition. A low-frequency electrical isolation inverter or a high-frequency electrical isolation inverter, which is respectively referred to as a low-frequency link's inverter or a high-frequency link's inverter, is provided between the output AC load or an AC electrical grid and an input DC power source. The roles played by electrical isolation elements mainly include realizing the electrical isolation between an output and an input of the inverter and improving safety, reliability and electromagnetic compatibility in the course of the operation of the inverter and matching an output voltage and an input voltage of the inverter which realizes the technical effects that the output voltage of the inverter is higher than, equal to, or lower than the input voltage of the inverter, so as to greatly broaden the application field thereof. Therefore, in the case of secondary electric power conversion of DC power sources such as DC generators, accumulators, photovoltaic cells and fuel cells, the inverters are important in applications.

New energy sources (also known as green energy sources) such as solar energy, wind energy, tidal energy and geothermal energy have the advantages of being clean, pollution-free, cheap, reliable, and sufficient. Therefore, the prospects for applications are vast. Since traditional fossil fuels (non-renewable energy sources) such as petroleum, coal and natural gas have become gradually insufficient and cause severe environmental pollution, global warming, and also since the nuclear energy production results in nuclear waste and environmental pollution, people increasingly have focused on the development and utilization of new energy sources. New energy power generation mainly includes photovoltaics, wind power generation, fuel cells, hydraulic power generation, and geothermal power generation, but all of them have deficiencies. For instance, their power supply is unstable, unsustainable and varies with climate changes. Hence, it is imperative to employ a distributed power supply system collectively supplied by various new energy sources.

A traditional new energy source distributed power supply system, as shown in FIGS. 1 and 2, usually employs a plurality of single-input DC converters to respectively perform an electric energy conversion on new energy power generation equipment without the need storing energy, such as a photovoltaic cell, a fuel cell, or a wind power generator, through a unidirectional converter. Moreover, the new energy power generation equipment is connected to a DC bus bar of a common inverter after output ends are connected in parallel or in series, for ensuring cooperative power supply and coordinative work of various new energy sources. The distributed power generation system realizes that a plurality of input sources are simultaneously supplying the power for the load and realizes a preferential use of the energy sources, which enhances the stability and flexibility of the system. Nevertheless, there are defects such as a two-stage power conversion, a low power-density, a low conversion efficiency, and a high cost, thereby limiting the applicability to a great extent.

To simplify a circuit structure and diminish power conversion stages, a novel multi-input inverter having a single-stage circuit structure shown in FIG. 3 is used to substitute a novel single-stage new energy source distributed power supply system formed by a traditional multi-input inverter having a DC converter and an inverter two-stage cascade circuit structure. The single-stage multi-input inverter allows inputting various new energy sources. The input energy sources may have the same or greatly different properties, amplitudes, and characteristics. The novel single-stage new energy source distributed power supply system has advantages that the system has a simple circuit structure and a single-stage power conversion; a plurality of input sources supply electric power to the load simultaneously or in a time-sharing manner in a high-frequency switching period; and the cost is low.

Therefore, it is urgent to seek a single-stage multi-input inverter that allows various new energy sources to collectively supply power and the novel single-stage new energy source distributed power supply system, which is very significant to enhancing stability and flexibility of the system, and realizing a preferential or full use of the new energy sources.

SUMMARY

It is an objective for the present disclosure to provide a single-stage multi-input buck type low-frequency link's inverter with an external parallel-timesharing select switch, wherein the inverter is cooperatively supplied by various new energy sources; the input DC power supplies are connected to ground; a parallel-timesharing select switch is arranged outside a multi-input single-output high-frequency inverter circuit; a low-frequency isolation is performed between an output and an input of the inverter; a plurality of input power supplies supply electric power in a time-sharing manner in a switching period; the inverter has a simple circuit topology; an output low-frequency transformer-filter circuit is common; a single-stage power conversion is performed; a conversion efficiency is high; an output voltage ripple is small, the output capability is large; and the application prospect is vast.

The technical solution of the present disclosure is as follows: the single-stage multi-input buck type low-frequency link's inverter with the external parallel-timesharing select switch is formed by connecting a plurality of connected-to-ground input filters and one common output low-frequency isolation voltage-transformation filter circuit through one multi-input single-output high-frequency inverter circuit. Each input end of the multi-input single-output high-frequency inverter circuit is connected to an output end of each of the input filters in a manner of one-to-one correspondence. The output ends of the multi-input single-output high-frequency inverter circuit are connected to an input end of a low-frequency transformer of the output low-frequency isolation voltage-transformation filter circuit or are connected to an input end of an output filter inductor, wherein the input end of an output filter inductor is not connected to the low-frequency transformer; or are connected to the input end of the output filter. The multi-input single-output high-frequency inverter circuit is composed of an external multi-path parallel-timesharing select four-quadrant power switch circuit and a bidirectional power flow single-input single-output high-frequency inverter circuit, which are successively connected in cascade. The multi-input single-output high-frequency inverter circuit is equivalent to one bidirectional power flow single-input single-output high-frequency inverter circuit at any time. Each path of the external multi-path parallel-timesharing select four-quadrant power switch circuit includes only one four-quadrant power switch and output ends of all paths are connected in parallel. The output low-frequency isolation voltage-transformation filter circuit includes the low-frequency transformer and the output filter; or the output filter inductor, the low-frequency transformer, and an output filter capacitor; or the output filter and the low-frequency transformer which are successively connected in cascade. The multi-input single-output high-frequency inverter circuit of the single-stage multi-input buck type low-frequency link's inverter modulates the multi-path input DC voltage source $U_{i1}, U_{i2}, \ldots, U_{in}$ into a bipolar two-state multi-level SPWM voltage wave or a unipolar three-state multi-level SPWM voltage wave, wherein an amplitude of the bipolar two-state multi-level SPWM voltage wave or the unipolar three-state multi-level SPWM voltage wave varies with variation of the input DC voltage. The bipolar two-state multi-level SPWM voltage wave or the unipolar three-state multi-level SPWM voltage wave passes through the low-frequency transformer and an output LC filter, or through the output filter inductor, the low-frequency transformer, and the output filter capacitor, or through the output filter inductor, the output filter capacitor, and the low-frequency transformer, to obtain a high-quality sinusoidal AC voltage or sinusoidal AC current on a single-phase AC passive load or a single-phase AC power grid, wherein n represents a path number of a plurality of input sources and n is a natural number more than 1. A circuit topology of the single-stage multi-input buck type low-frequency link's inverter includes a push-pull circuit, a push-pull forward circuit, a half-bridge circuit, or a full-bridge circuit. Each of the push-pull circuit, the push-pull forward circuit, and the half-bridge circuit is composed of n four-quadrant high-frequency power switches capable of withstanding bidirectional voltage stress and bidirectional current stress and two two-quadrant high-frequency power switches capable of withstanding unidirectional voltage stress and the bidirectional current stress. The full-bridge circuit is composed of n four-quadrant high-frequency power switches capable of withstanding bidirectional voltage stress and bidirectional current stress and four two-quadrant high-frequency power switches capable of withstanding unidirectional voltage stress and the bidirectional current stress. An independent power supply system formed by the single-stage multi-input buck type low-frequency link's inverter employs an energy management control strategy of an instantaneous output voltage and input current feedback bipolar SPWM or unipolar SPWM master-slave power distribution, wherein output powers of $1^{st}$, $2^{nd}, \ldots n-1^{th}$ paths of input sources are fixed and a shortage of power needed by a load is supplied by the $n^{th}$ path of input sources. A grid-tied power generating system formed by the single-stage multi-input buck type low-frequency link's inverter employs an energy management control strategy of an input current instantaneous feedback bipolar SPWM or unipolar SPWM maximum power output of the $1^{st}$, $2^{nd}, \ldots n^{th}$ paths of input sources. The single-stage multi-input buck type low-frequency link's inverter converts a plurality of connected-to-ground and unstable input DC voltages into a stable high-quality output AC needed by the load through a single-stage low-frequency isolation. The plurality of input sources supply electric power to the load simultaneously in a high-frequency switching period, or the plurality of input sources supply the electric power to the load in a time-sharing manner in the high-frequency switching period.

In the present disclosure, the DC converter and the inverter of various traditional multiple new energy source cooperative power supply systems are successively connected in cascade to form a multi-input inverter circuit structure and further forming a single-stage multi-input inverter circuit structure with a novel external parallel-timesharing select switch. The present disclosure proposes a circuit structure of a single-stage multi-input buck type low-frequency link's inverter with an external parallel-timesharing select switch. The topology family and the energy management control strategy thereof, namely, the circuit structure is formed by connecting the plurality of connected-to-ground input filters and the common output low-frequency isolation voltage-transformation filter circuit in cascade through the multi-input single-output high-frequency inverter circuit with the external parallel-timesharing select four-quadrant power switch.

According to the present disclosure, the single-stage multi-input buck type low-frequency link's inverter with an external parallel-timesharing select switch can convert a plurality of connected-to-ground and unstable input DC voltages into a stable high-quality output AC needed by the load and has following advantages: a plurality of input AC power supplies are connected to ground; an electrical isolation is not performed between the multi-input single-output high-frequency inverter circuits; the low-frequency isolation is performed between the output and the input; the multi-input power supply supplies electric power in a time-sharing manner in the switching period; the circuit topology is simple, the output low-frequency voltage-transformation filter circuit is common; the single-stage power conversion is performed; the conversion efficiency is high; the output voltage ripple is small; the output capability is large, and has broad applications. The single-stage multi-input buck type low-frequency link's inverter with an external parallel-timesharing select switch has an overall property superior to the multi-input inverter formed by connecting the traditional DC converter and the inverter in two-stage cascade.

DETAILED DESCRIPTION OF THE EMBODIMENTS

Figure 1:
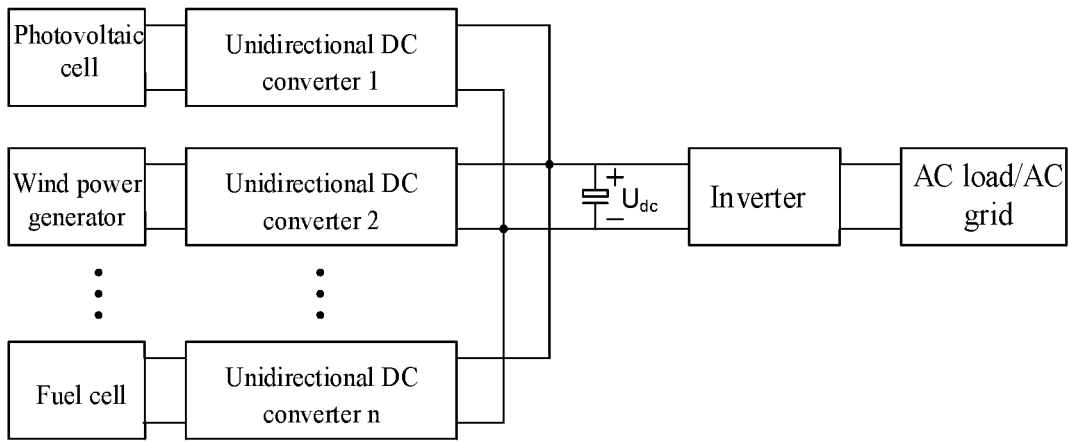
FIG. 1 shows a two-stage new energy source distributed power supply system with output ends of a plurality of traditional unidirectional DC converter connected in parallel.
Figure 2:
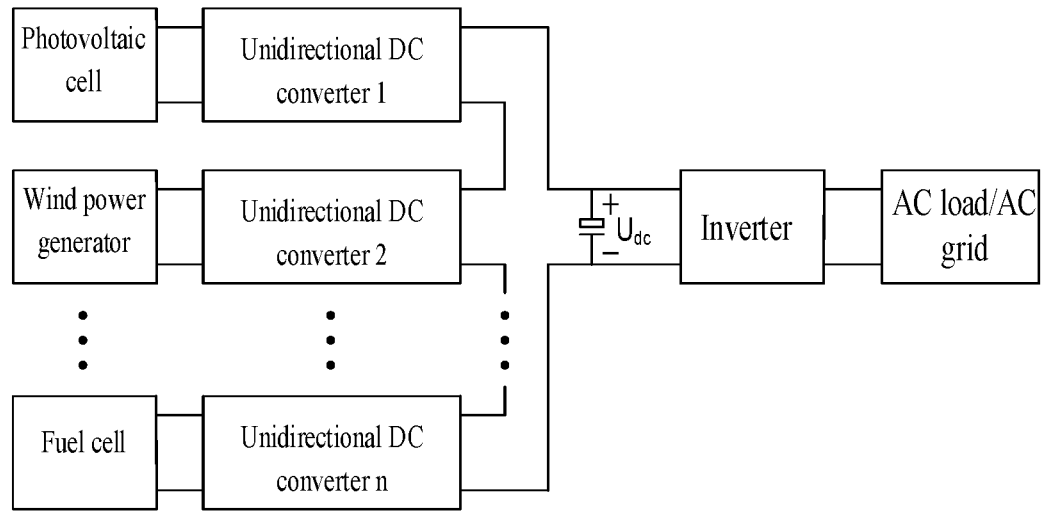
FIG. 2 shows a two-stage new energy source distributed power supply system with output ends of a plurality of traditional unidirectional DC converter connected in series.
Figure 3:
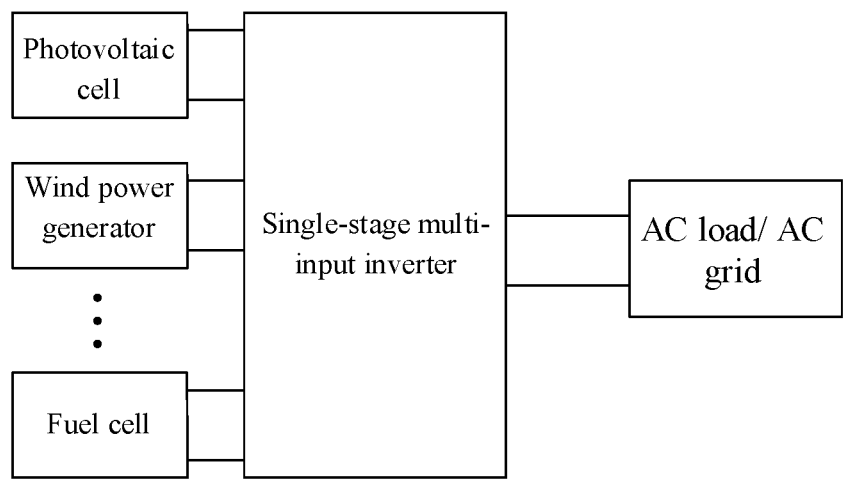
FIG. 3 is a schematic block diagram of a novel single-stage multi-input inverter.
Figure 4:
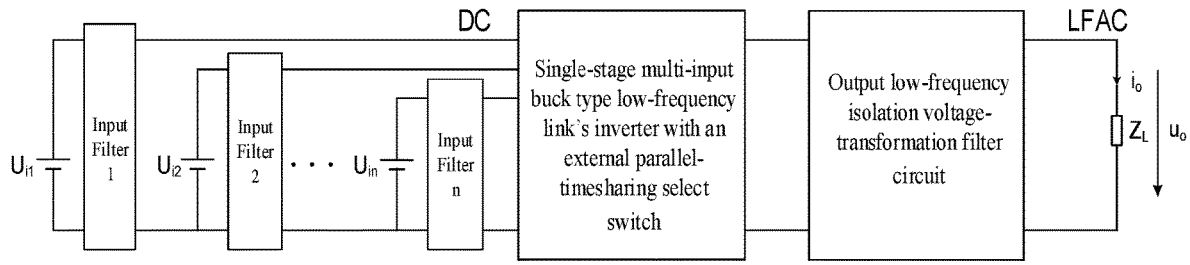
FIG. 4 is a schematic block diagram of a single-stage multi-input buck type low-frequency link's inverter with an external parallel-timesharing select switch.
Figure 5:
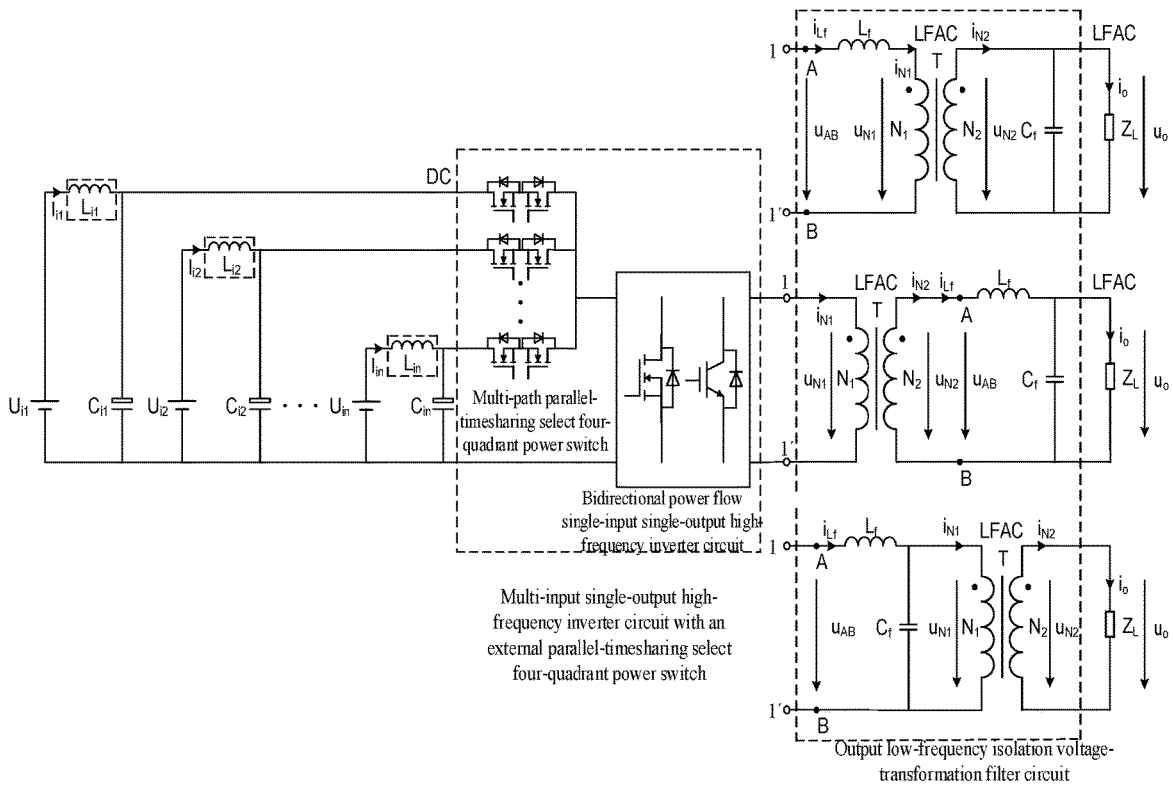
FIG. 5 is a structural diagram showing a circuit of the single-stage multi-input buck type low-frequency link's inverter with an external parallel-timesharing select switch.
Figure 6:
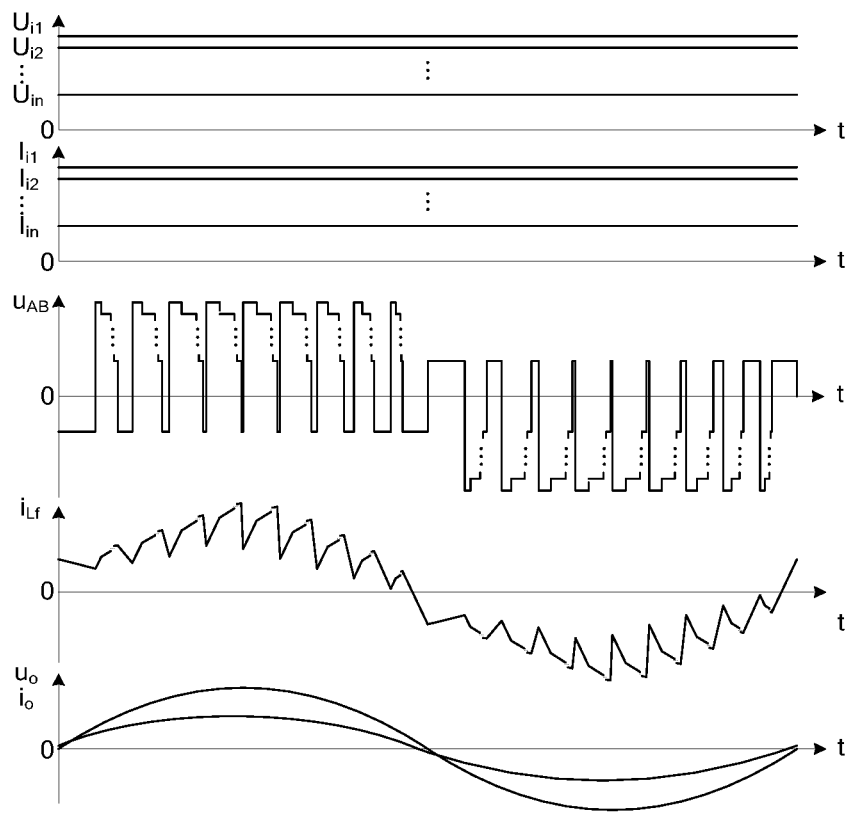
FIG. 6 is a schematic oscillogram showing a steady state of a bipolar SPWM (sinusoidal pulse width modulation) control the single-stage multi-input buck type low-frequency link's inverter with an external parallel-timesharing select switch.
Figure 7:
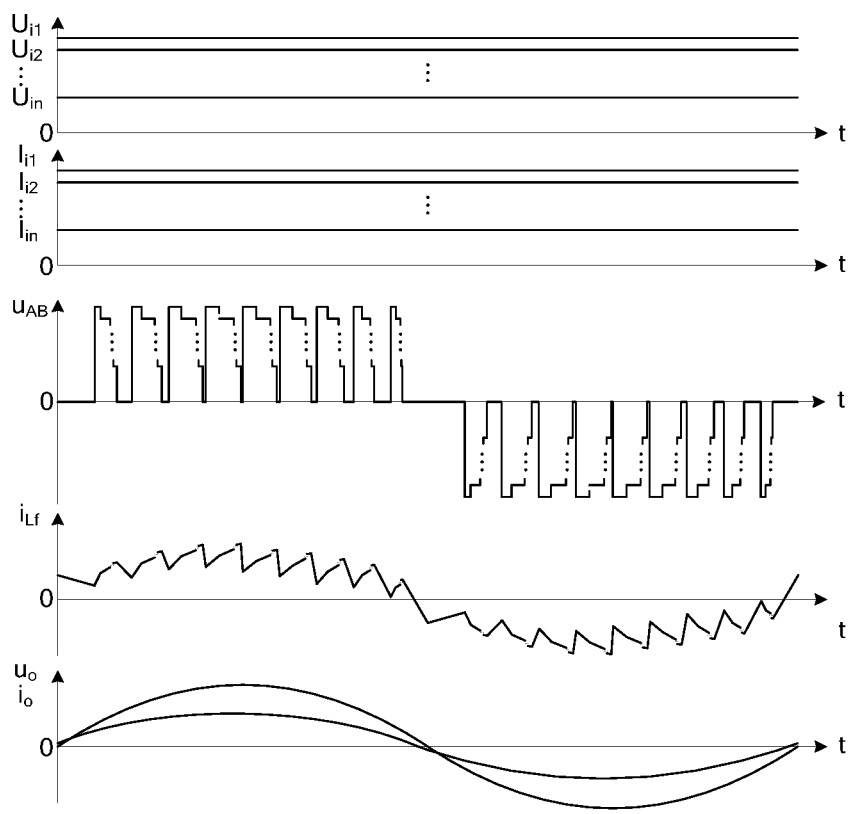
FIG. 7 is a schematic oscillogram showing a steady state of a unipolar SPWM control of the single-stage multi-input buck type low-frequency link's inverter with an external parallel-timesharing select switch.
Figure 8:
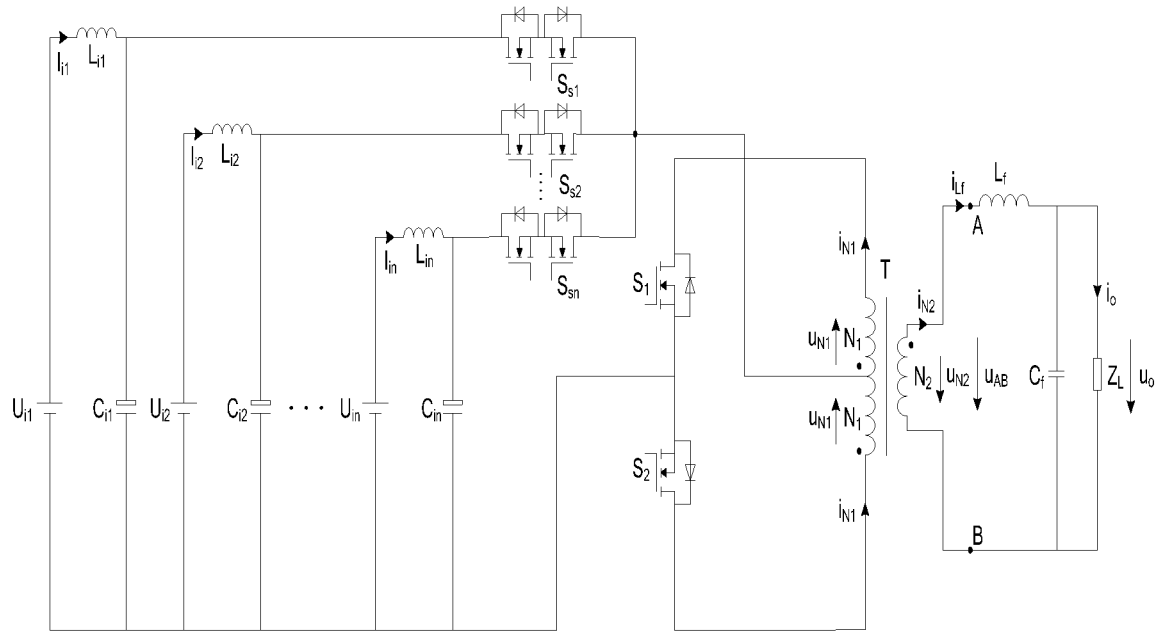
FIG. 8 is a schematic diagram of a push-pull circuit of the topology embodiment 1 of the single-stage multi-input buck type low-frequency link's inverter with an external parallel-timesharing select switch.
Figure 9:
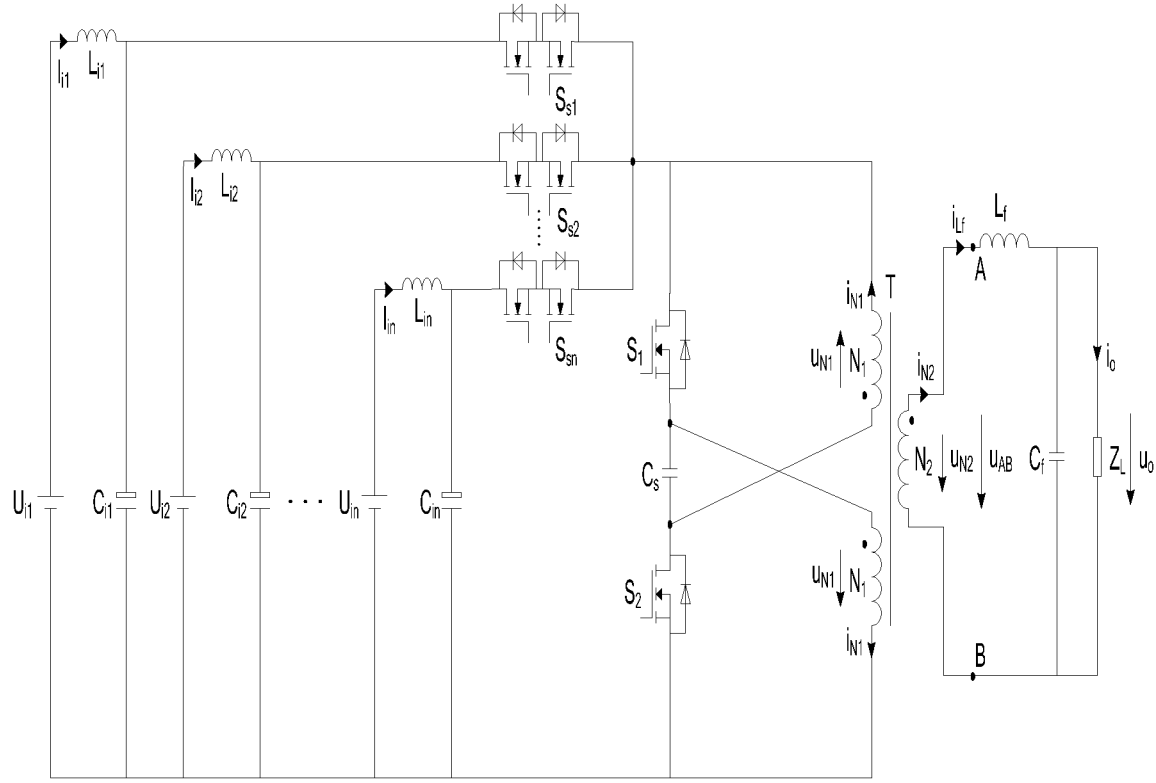
FIG. 9 is a schematic diagram of a push-pull forward circuit of the topology embodiment 2 of the single-stage multi-input buck type low-frequency link's inverter with an external parallel-timesharing select switch.

The technical solution of the present disclosure will be further described hereinafter with reference to the drawings and the embodiments of the specification.

A single-stage multi-input buck type low-frequency link's inverter with an external parallel-timesharing select switch is formed by connecting a plurality of connected-to-ground input filters and a common output low-frequency isolation voltage-transformation filter circuit through a multi-input single-output high-frequency inverter circuit. Each input end of the multi-input single-output high-frequency inverter circuit is connected to an output end of each of the input filters in a manner of one-to-one correspondence. An output end of the multi-input single-output high-frequency inverter circuit is connected to an input end of a low-frequency transformer of the output low-frequency isolation voltage-transformation filter circuit, or an input end of an output filter inductor wherein the input end of the output filter inductor is not connected to the low-frequency transformer, or an input end of the output filter. The multi-input single-output high-frequency inverter circuit includes an external multi-path parallel-timesharing select four-quadrant power switch circuit and a bidirectional power flow single-input single-output high-frequency inverter circuit which are successively connected in cascade. The multi-input single-output high-frequency inverter circuit is equivalent to one bidirectional power flow single-input single-output high-frequency inverter circuit at any time. Each path of the external multi-path parallel-timesharing select four-quadrant power switch circuit includes only one four-quadrant power switch and output ends of all paths are connected to each other in parallel. The output low-frequency isolation voltage-transformation filter circuit includes the low-frequency transformer and the output filter, or includes the output filter inductor, the low-frequency transformer, and an output filter capacitor, or includes the output filter and the low-frequency transformer connected successively in cascade.

A schematic block diagram, a circuit structure of the single-stage multi-input buck type low-frequency link's inverter with an external parallel-timesharing select switch, a steady-state schematic oscillogram of a bipolar SPWM control inverter and a unipolar SPWM control inverter are respectively shown in FIGS. 4, 5, 6, and 7. In FIGS. 4, 5, 6, and 7, $U_{i1}, U_{i2}, \ldots, U_{in}$ are n (n is a natural number larger than 1) paths of input DC voltage sources. $Z_L$ is a single-phase output AC load (including a single-phase output DC passive load and a single-phase DC power grid load) and $u_O$ and $i_O$ are respectively a single-phase output alternating voltage and an alternating current. An n-input single-output high-frequency inverter circuit is composed of an external multi-path parallel-timesharing select four-quadrant power switch circuit and a bidirectional power flow single-input single-output high-frequency inverter circuit which are successively connected in cascade, wherein the external multi-path parallel-timesharing select four-quadrant power switch circuit is composed of n four-quadrant high-frequency power switches capable of withstanding bidirectional voltage stress and bidirectional current stress. The bidirectional power flow single-input single-output high-frequency inverter circuit is composed of a plurality of two-quadrant high-frequency power switches capable of withstanding a unidirectional voltage stress and a bidirectional current stress, which may employ power devices such as MOSFET, IGBT, GTR. In the dashed block (the '1' end and '1'' end are connecting ends), the output low-frequency isolation voltage-transformation filter circuit is composed of the low-frequency transformer and the output filter successively connected in cascade, or is composed of the output filter inductor, the low-frequency transformer, and the output filter capacitor (a primary-side leakage inductance of the low-frequency transformer can be absorbed and utilized by the output filter inductor or completely used to function as an output filter inductor) successively connected in cascade, or is composed of the output filter inductor, the output filter capacitor, and the low-frequency transformer successively connected in cascade. Due to space limitations, the drawings only show a circuit diagram of a LC output filter or the output filter capacitor applicable to a passive AC load, and do not show a circuit diagram of a LCL output filter applicable to the AC power grid load, or the output filter capacitor added with the output filter inductor. The n-path input filter may be the LC filter (which includes the filter inductors $L_{i1}, L_{i2}, \ldots, L_{in}$ in the dashed block) or the filter capacitor (which does not include the filter inductors $L_{i1}, L_{i2}, \ldots, L_{in}$ in the dashed block). When the LC filter is employed, n paths of input direct currents will be smoother. The n-input single-output high-frequency inverter circuit modulates the n-path input DC voltage source $U_{i1}, U_{i2}, \ldots, U_{in}$ into a bipolar two-state or a unipolar three-state multi-level SPWM voltage wave, an amplitude of which varies with variation of the input DC voltage. The voltage wave passes through the low-frequency transformer T and the output filter $L_f$-$C_f$, or through the output filter inductor $L_f$, the low-frequency transformer T, and the output filter capacitor $C_f$, or through the output filter inductor $L_f$, the output filter capacitor $C_f$, and the low-frequency transformer T, to obtain a high-quality sinusoidal AC voltage $u_o$ or sinusoidal AC current $i_o$ on the single-phase AC passive load or the single-phase AC power grid. There are n input pulse currents of the n-input single-output high-frequency inverter circuit which pass through the input filters $L_{i1}$-$C_{i1}$, $L_{i2}$-$C_{i2}, \ldots, L_{in}$-$C_{in}$ or $C_{i1}, C_{i2}, \ldots, C_{in}$. Then smooth input direct currents $I_{i1}, I_{i2}, \ldots, I_{in}$ are obtained in the n paths of input DC power supplies $U_{i1}, U_{i2}, \ldots, U_{in}$. It should be further noted that, when the output low-frequency isolation voltage-transformation filter circuit is composed of the low-frequency transformer and the output filter which are successively connected in cascade, amplitudes of the bipolar two-state and unipolar three-state multi-level SPWM voltage wave $u_{AB}$ in a +1 state are $U_{i1}N_2/N_1, U_{i2}N_2/N_1, \ldots, U_{in}N_2/N_1$, while an amplitude thereof in a +1 state is $U_{in}N_2/N_1$ (it is designed for energy on an AC side to be fed back only through the $n^{th}$ path of the input source $U_{in}$. Alternatively, energy on the AC side may be fed back through any other path of the input source.). When the output low-frequency isolation voltage-transformation filter circuit is composed of the output filter inductor, the low-frequency transformer, and the output filter capacitor that are successively connected in cascade; or is composed of the output filter inductor, the output filter capacitor and the low-frequency transformer that are successively connected in cascade, amplitudes of the bipolar two-state and unipolar three-state multi-level SPWM voltage wave $u_{AB}$ in the +1 state are $U_{i1}, U_{i2}, \ldots, U_{in}$, while an amplitude thereof in the −1 state is $U_{in}$ (it is designed for the energy on the AC side to be fed back only through the $n^{th}$ path of the input source Um. Alternatively, the energy on the AC side may be fed back through any other path of the input source.)

The single-stage multi-input buck type low-frequency link's inverter with an external parallel-timesharing select switch is a buck inverter, which has n input sources connected in parallel and supplying the electric power in a time-sharing manner. Assuming amplitudes of output signals $I_{1e}, I_{2e}, \ldots, I_{(n-1)e}$ of n−1 input source error amplifiers and an output signal $u_e$ of an output voltage error amplifier to be hem, $I_{1em}, I_{2em}, I_{(n-1)em}, U_{em}$, and an amplitude of a sawtooth carrier signal $u_c$ to be $U_{cm}$. Corresponding modulation degrees are $m_1 = I_{1em}/U_{cm}, m_2 = I_{2em}/U_{cm}, \ldots, m_n = U_{em}/U_{cm}$, wherein $0 \leq m_1, m_2, \ldots, m_n \leq 1$ and $m_1 < m_2 < \ldots, < m_n$. The principle of the inverter is that a plurality of voltage type single-input inverters are superposed on the voltage of the output end, namely a relationship between the output voltage $u_o$, the input DC voltage ($U_{i1}, U_{i2}, \ldots, U_{in}$), a turn ratio $N_2/N_1$ of the low-frequency transformer, and the modulation degrees ($m_1, m_2, \ldots, m_n$) can be expressed as $u_o = [(m_1 U_{i1} + (m_2 - m_1)U_{i2} + \ldots + (m_n - m_{n-1})U_{in})]N_2/N_1$ (when the inverter is controlled by a unipolar SPWM) or $u_o = [(2m_1 - 1)U_{i1} + (2m_2 - 2m_1 - 1)U_{i2} + \ldots + (2m_a - 2m_{n-1} - 1)U_{in}]N_2/N_1$ (when the inverter is controlled by a bipolar SPWM). If proper modulation degrees $m_1, m_2, \ldots, m_n$ and the turn ratio $N_2/N_1$ of the low-frequency transformer are given, $u_o$ may be larger than, equal to or lower than a sum of the input DC voltages $U_{i1} + U_{i2} + \ldots + U_{in}$. The low-frequency transformer of the inverter not only enhances the safety, the reliability and the electromagnetic compatibility of the inverter in the course of operation, but also importantly matches the output voltage and the input voltage, thereby realizing the technical effect that the output voltage of the inverter may be larger than, equal to, or lower than the sum of the input DC voltages $U_{i1} + U_{i2} + \ldots + U_{in}$, and broadens the field of application. Because $0 < m_1 + (m_2 - m_1) + \ldots + (m_a - m_{n-1}) < 1$ (when the inverter is controlled by the unipolar SPWM) and $0.5 < m_1 + (m_2 - m_1) + \ldots + (m_n - m_{n-1}) < 1$ (when the inverter is controlled by the bi-polar SPWM), $u_o < (U_{i1} + U_{i2} + \ldots + U_{in})N_2/N_1$, namely the output voltage $u_o$ is always lower than a sum of products $(U_{i1} + U_{i2} + \ldots + U_{in})N_2/N_1$ of the input DC voltages ($U_{i1}, U_{i2}, \ldots, U_{in}$) and the turn ratio $N_2/N_1$ of the low-frequency transformer. Since the inverter has a single-stage circuit structure, a working frequency of the transformer of the inverter is equal to a frequency of the output voltage and the multi-path parallel-timesharing select four-quadrant power switch is located outside the high-frequency inverter circuit. These kind of inverters are referred to as a single-stage multi-input buck type (voltage type) low-frequency link's inverter with an external parallel-timesharing select switch. The n input sources of the inverter can supply electric power to the output AC load in a high-frequency switch period only in a time-sharing manner, wherein the modulation degrees may be equal (i.e. $m_1 = m_2 = \ldots = m_n$), or not equal (i.e. $m_1 \neq m_2 \neq \ldots \neq m_n$).

Since the single-stage multi-input buck type low-frequency link's inverter with an external parallel-timesharing select switch shares one bidirectional power flow single-input single-output high-frequency inverter circuit and one output low-frequency isolation voltage-transformation filter circuit, the single-stage multi-input buck type low-frequency link's inverter with an external parallel-timesharing select switch is essentially different from the circuit structure of the traditional multi-input inverter composed of the DC convertor and the inverter connected in two-stage cascade. Therefore, the inverter of the present disclosure is novel and creative. Moreover, the inverter has the following advantages: low-frequency isolation is performed on the output and the input; the multi-input power supply supplies electric power in a time-sharing manner; the circuit topology is simple; a single-stage power conversion is performed; a conversion efficiency of the single-stage power conversion is high (that means less energy losses); the output voltage can be flexibly configured; the output voltage ripple is small; the output capability is large; the cost is low; and the prospect for applications is vast. Thus, the inverter of the present disclosure is an ideal energy-saving and consumption-reducing single-stage multi-input inverter and is of greater value in the present era of an energy-saving and conservation-minded society that we strongly advocate.

Figure 10:
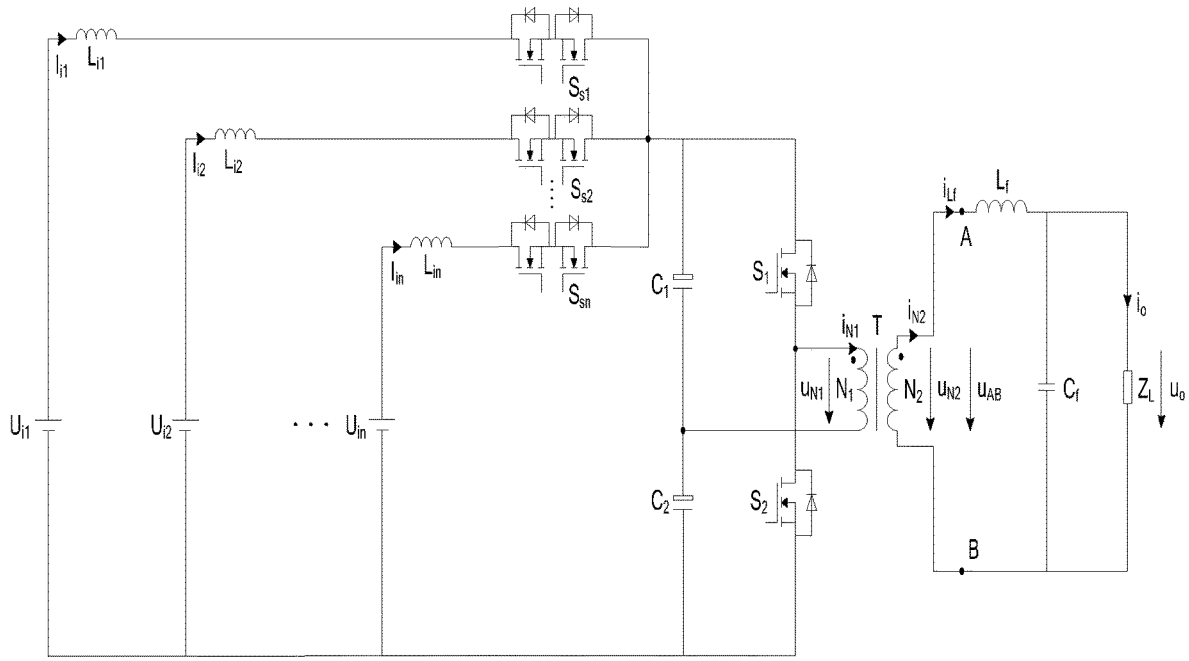
FIG. 10 is a schematic diagram I of a half-bridge circuit of the topology embodiment 3 of the single-stage multi-input buck type low-frequency link's inverter with an external parallel-timesharing select switch.
Figure 11:
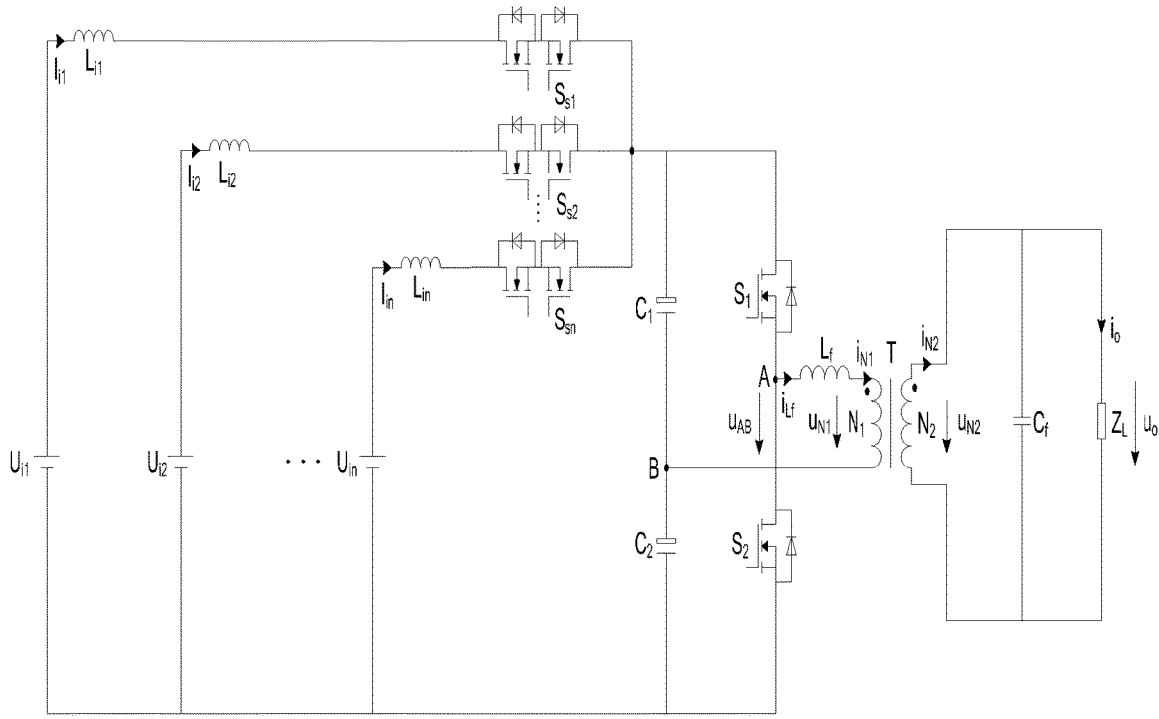
FIG. 11 is a schematic diagram II of the half-bridge circuit of the topology embodiment 4 of the single-stage multi-input buck type low-frequency link's inverter with an external parallel-timesharing select switch.
Figure 12:
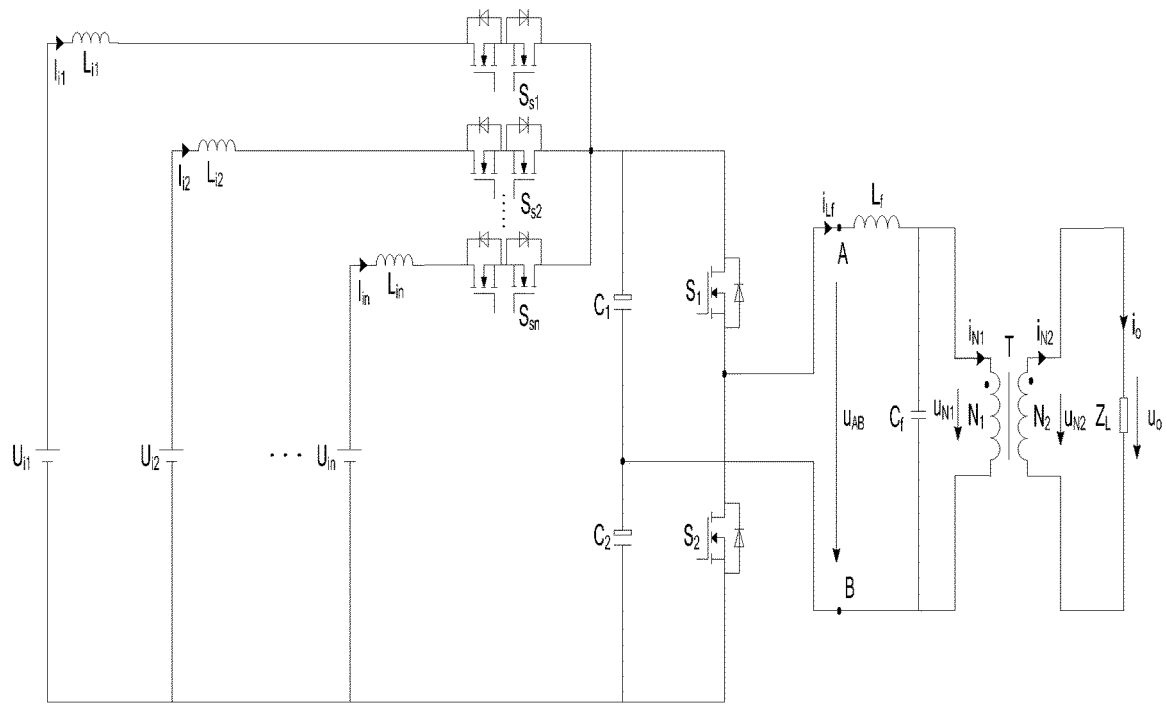
FIG. 12 is a schematic diagram III of the half-bridge circuit of the topology embodiment 5 of the single-stage multi-input buck type low-frequency link's inverter with an external parallel-timesharing select switch.
Figure 13:
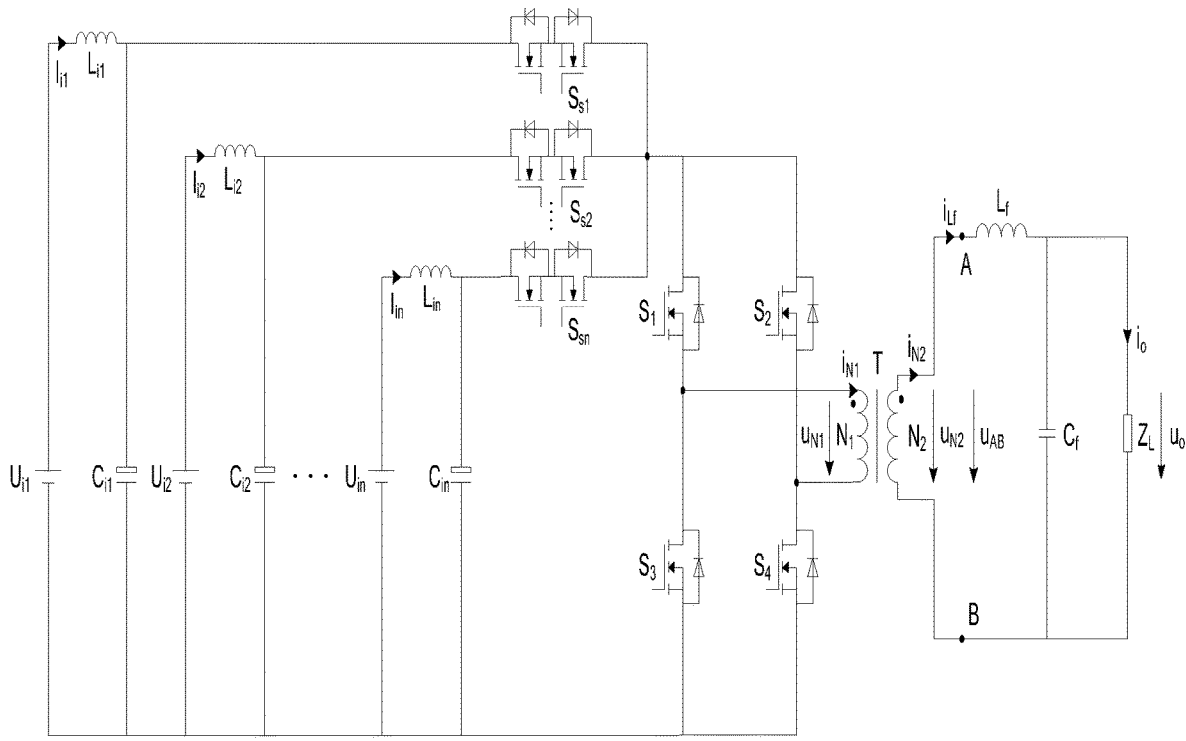
FIG. 13 is a schematic diagram I of a full-bridge circuit of the topology embodiment 6 of the single-stage multi-input buck type low-frequency link's inverter with an external parallel-timesharing select switch.
Figure 14:
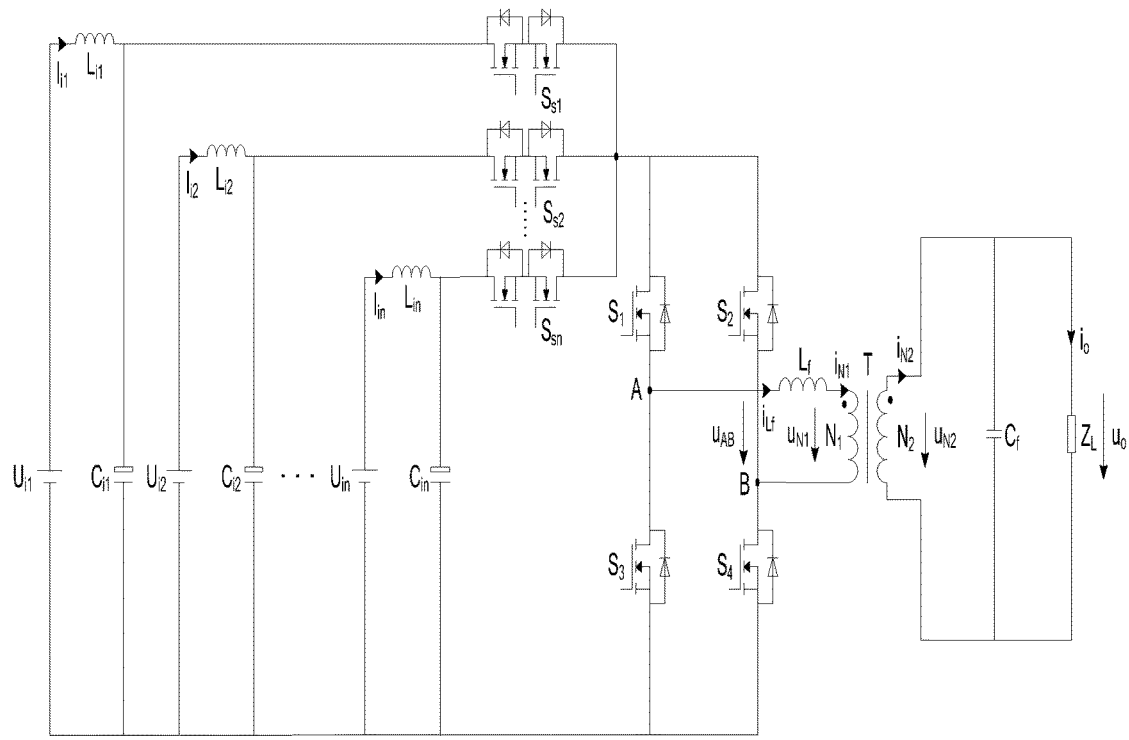
FIG. 14 is a schematic diagram II a full-bridge circuit of the topology embodiment 7 of the single-stage multi-input buck type low-frequency link's inverter with an external parallel-timesharing select switch.
Figure 15:
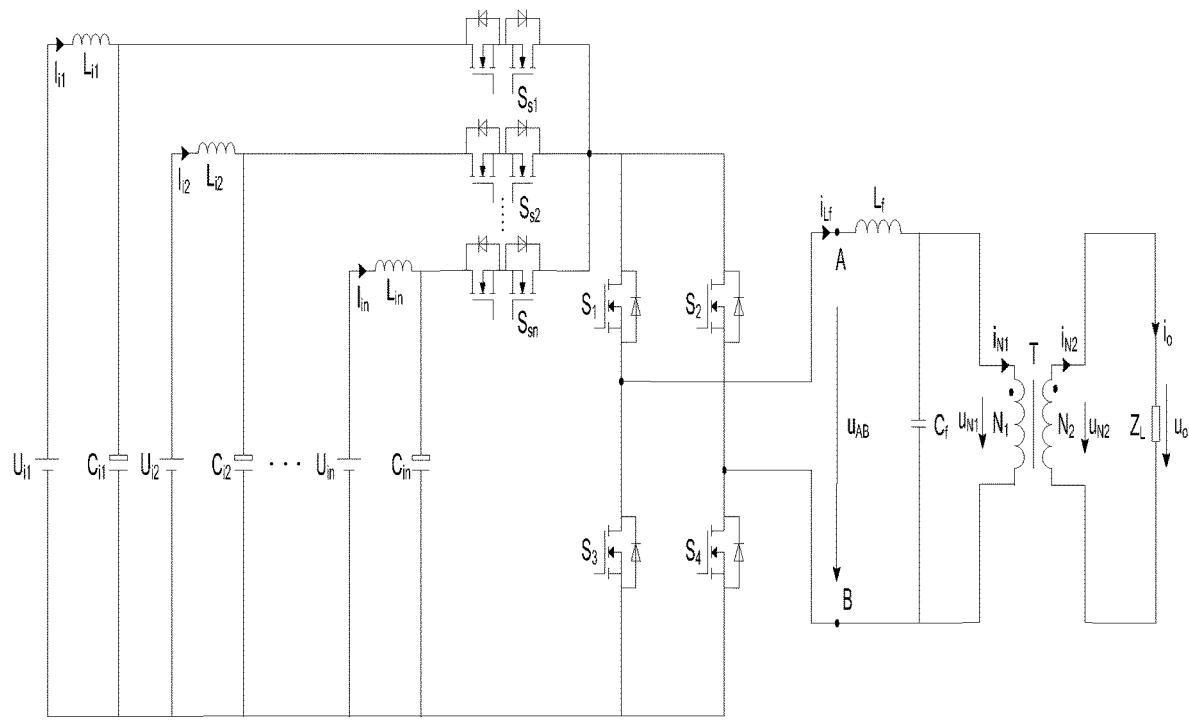
FIG. 15 is a schematic diagram III a full-bridge circuit of the topology embodiment 8 of the single-stage multi-input buck type low-frequency link's inverter with an external parallel-timesharing select switch.
Figure 16:
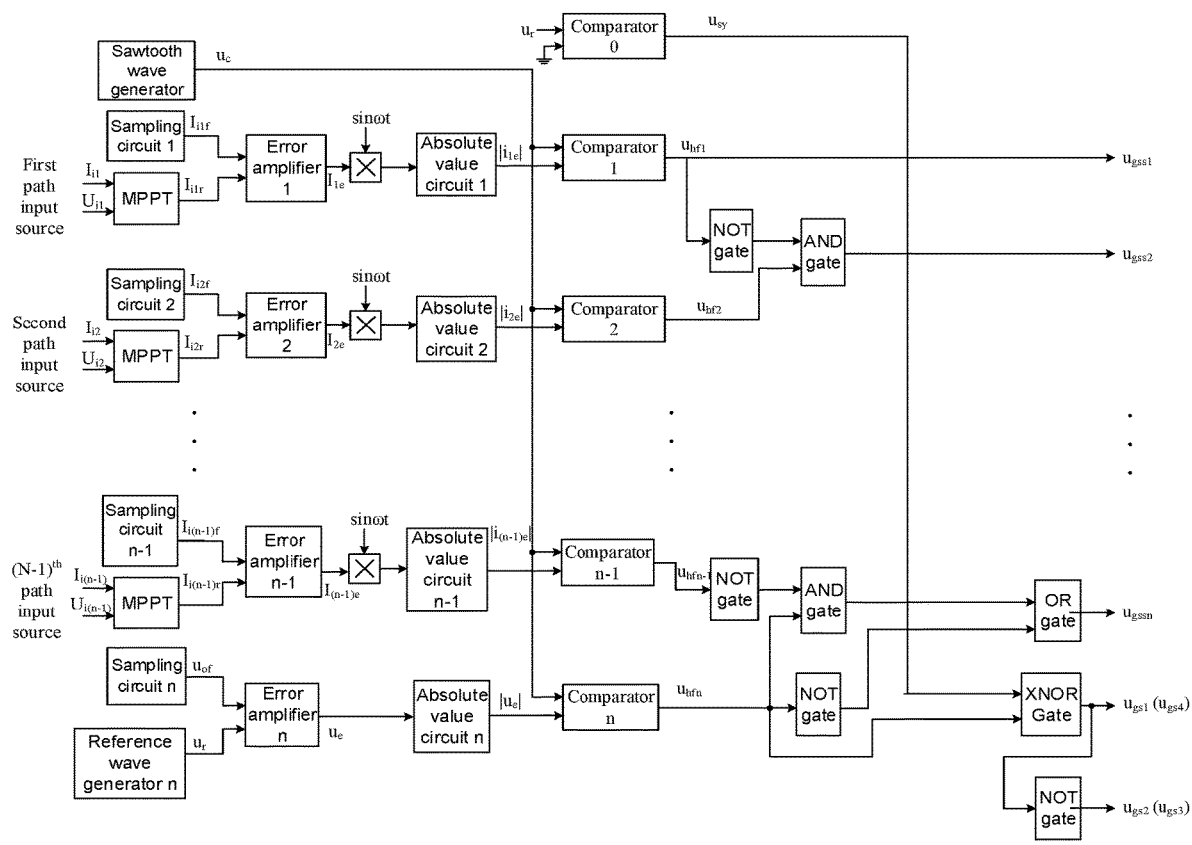
FIG. 16 is a block diagram of energy management control showing an instantaneous output voltage and input current feedback bipolar SPWM master-slave power distribution of the single-stage multi-input buck type low-frequency link's inverter with an external parallel-timesharing select switch.

Embodiments of the topology family of the single-stage multi-input buck type low-frequency link's inverter with an external parallel-timesharing select switch are shown in FIGS. 8, 9, 10, 11, 12, 13, 14, and 15. As the circuit is shown in FIGS. 8-15, the external multi-path parallel-timesharing select four-quadrant power switch circuit is composed of n four-quadrant high-frequency power switches capable of withstanding the bidirectional voltage stress and the bidirectional current stress, The bidirectional power flow single-input single-output high-frequency inverter circuit is composed of a plurality of two-quadrant high-frequency power switches capable of withstanding the unidirectional voltage stress and the unidirectional current stress. As shown in FIGS. 8, 9, 10, 11, and 12, the push-pull circuit, the push-pull forward circuit, and the half-bridge circuit all include two two-quadrant high-frequency power switches. As shown in FIGS. 13, 14 and 15, the full-bridge circuit is composed of four two-quadrant high-frequency power switches. It should be further noted that, the circuits shown in FIGS. 8, 9, 10, 11, 12, 13, 14, and 15 show the case when the input inverter is the LC filter (as shown in FIGS. 10, 11, and 12, the input filter capacitors of the half-bridge circuit are two bridge arm capacitors $C_1$ and $C_2$), and fails to show a circuit in the case when the input filter is the capacitor filter. The push-pull forward circuit shown in FIG. 9 and the half-bridge circuits shown in FIGS. 10, 11, and 12 are merely applicable to the case when the voltages of n input power supplies are equal. The output low-frequency isolation voltage-transformation filter circuits of the half-bridge circuits I, II, III shown in FIGS. 10, 11, and 12 respectively are composed of the low-frequency transformer and the output filter which are successively connected in cascade, the output filter inductor and the low-frequency transformer which are successively connected in cascade and the output filter capacitor, the output filter and the low-frequency transformer which are successively connected in cascade. The output low-frequency isolation voltage-transformation filter circuits of the full-bridge circuits I, II, III shown in FIGS. 13, 14, and 15 respectively are composed of the low-frequency transformer and the output filter which are successively connected in cascade, the output filter inductor and the low-frequency transformer which are successively connected in cascade and the output filter capacitor, the output filter and the low-frequency transformer which are successively connected in cascade. The power switch voltage stresses of four topology embodiments of the single-stage multi-input buck type low-frequency link's inverter with an external parallel-timesharing select switch are shown in Table 1. In Table 1, $U_{imax}$=max($U_{i1}$, $U_{i2}$, ..., $U_{in}$), where N=1, 2, ..., n. The push-pull circuit, and the push-pull forward circuit are applicable to a high-power low-voltage input inverter. The half-bridge circuit is applicable to a medium-power high-voltage input inverter. The full-bridge circuit is applicable a high-power high-voltage input inverter. The circuit topology family is applicable to convert a plurality of connected-to-ground and unstable input DC voltages into a kind of high-quality output AC with a stable voltage, which can be used to achieve a novel, fine-property, a promising single-stage multi-new energy source distributed power supply system, a plurality of input sources, such as photovoltaic cells 40-60 VDC/220V50HzAC or 115V400HzAC, 10 kw proton exchange membrane fuel cells 85-120V/220V50HzAC or 115V400HzAC, small and medium-sized household wind power generators 24-36-48 VDC/220V50HzAC or 115V400HzAC, large-sized wind power generators 510 VDC/220V50HzAC or 115V400HzAC and are used to supply electric power for the AC load or the AC power grid.

TABLE 1

The power switch voltage stresses of four topology embodiments of the single-stage multi-input buck type low-frequency link's inverter with an external parallel-timesharing select switch.

| Circuit topology | | $S_{s1}$, $S_{s2}$, ..., $S_{sn}$ | $S_1$, $S_2$ | $S_3$, $S_4$ |
|---|---|---|---|---|
| Push-pull circuit | | max\|$U_{iN}$ − $U_{i1}$\|, max\|$U_{iN}$ − $U_{i2}$\|, ..., max\|$U_{iN}$ − $U_{in}$\| | $2U_{imax}$ | / |
| Push-pull forward circuit | | | $2U_{imax}$ | / |
| Half-bridge circuit | | | $U_{imax}$ | / |
| Full-bridge circuit | Bipolar SPWM | | | $U_{imax}$ |
| | Unipolar SPWM | $U_{i1}$ − ($U_{i1}$ + $U_{i2}$ + ... + $U_{in}$)/2n, $U_{i2}$ − ($U_{i1}$ + $U_{i2}$ + ... + $U_{in}$)/2n, ..., $U_{in}$ − ($U_{i1}$ + $U_{i2}$ + ... + $U_{in}$)/2n | | |

The energy management control strategy is crucial to a power supply system combined with a plurality of new energy sources. Due to a plurality of input sources and corresponding power switch units, a plurality of duty ratios are required/needed to be controlled, namely there are a plurality of control degrees of freedom, which make it possible for energy management of the plurality of new energy sources. The proposed energy management control strategies of the inverter should simultaneously have three functions which are energy management of the input sources, maximum power point tracking (MDPT) of new energy source generating equipment including the photovoltaic cell and a wind power generator, and controlling of the output voltage (current). In some cases, it is further required to charge/discharge control of the accumulator and to have a system with smooth and seamless switching between different power supplying modes. The proposed inverter employs two different energy management modes. The energy management mode I, is a master-slave distribution method, wherein the power needed by the load is supplied as much as possible by the $1^{st}$, $2^{nd}$, ... $n-1^{th}$ paths of the input sources of a main power supply equipment. When the input electric currents of the $1^{st}$, $2^{nd}$, ... $n-1^{th}$ paths of the input sources are determined, the input powers of the $1^{st}$, $2^{nd}$, ... $n-1^{th}$ paths of the input sources are determined accordingly. A shortage of the power needed by the load is supplied by the $n^{th}$ path of the input source of the power supply equipment, without the addition of accumulator power storage equipment. The energy management mode II, is a maximum power inputting method, wherein the $1^{st}$, $2^{nd}$, ..., $n^{th}$ paths of the input sources supply the maximum power to the load, which eliminates the accumulator power storage equipment and satisfies requirements of the grid-tied power generating system to make full use of the energy. One output end is connected in parallel to an accumulator charge/discharge device to realize the stability of the output voltage of the independent power supply system. When n paths of the input voltages of the new energy sources are all determined, the input powers of the $1^{st}$, $2^{nd}$, ... $n^{th}$ paths of the input sources can be controlled by controlling the input currents of the $1^{st}$, $2^{nd}$, ... $n^{th}$ paths of the input sources.

The single-stage multi-input buck type low-frequency link's inverter with an external parallel-timesharing select switch employs the energy management control strategy of an instantaneous output voltage and input current feedback bipolar SPWM or unipolar SPWM master-slave power distribution to form the independent power supply system, or employs the energy management control strategy of an input current instantaneous feedback bipolar SPWM or unipolar SPWM maximum power output to form the grid-tied power generating system. The energy management control block diagrams and control schematic waveforms of an output voltage and the input current feedback bipolar SPWM or unipolar SPWM master-slave power distribution when the powers of the $1^{st}$, $2^{nd}$, ... $n-1^{th}$ paths of input energy sources are fixed and the short power needed by the load is supplied by the $n^{th}$ path of input sources are respectively shown in FIGS. 16, 17, 18, and 19. The $1^{st}$, $2^{nd}$, ... $n-1^{th}$ paths of input current feedback signals, $I_{i1f}$, $I_{i2f}$, ..., $I_{i(n-1)f}$ of the inverter and reference current signals $I_{i1r}$, $I_{i2r}$, ..., $I_{i(n-1)r}$ obtained by computing the $1^{st}$, $2^{nd}$, ... $n-1^{th}$ paths of input sources through a maximum power point are compared and magnified by a proportional-integral controller. The magnified error signals $I_{1e}$, $I_{2e}$, ..., $I_{(n-1)e}$ are respectively multiplies by the sinusoidal synchronizing signals and then pass through absolute value circuits 1, 2, ..., n-1 to obtain $|i_{1e}|$, $|i_{2e}|$, ..., $|i_{(n-1)e}|$. An output voltage feedback signal $u_{of}$ of the inverter and a reference sinusoidal voltage $u_r$ are compared and magnified by the proportional-integral controller. The magnified error signal $u_e$ passes through the absolute value circuit n to obtain $|u_{1e}|$. The $|i_{1e}|$, $|i_{2e}|$, ..., $|i_{(n-1)e}|$, and $|u_e|$ respectively cross with a sawtooth carrier wave $u_c$, while it is considered to output the voltage gating signal and pass through a proper combinational logic circuit to obtain the power switch control signals $u_{gss1}$, $u_{gss2}$, ..., $u_{gssn}$, $u_{gs1}$, $u_{gs2}$, $u_{gs3}$, $u_{gs4}$. The $1^{st}$, $2^{nd}$, ... $n-1^{th}$ paths of current regulators and an $n^{th}$ voltage regulator work respectively and individually. The $1^{st}$, $2^{nd}$, ... $n-1^{th}$ paths of current regulators are used to realize the maximum power outputting of the $1^{st}$, $2^{nd}$, ... $n-1^{th}$ paths of the input sources. The $n^{th}$ voltage regulator is used to realize the stability of the inverter output voltage. The n paths of input sources collectively supply electric power to the load. When the input voltage or the load varies, the error voltage signal $|u_e|$ and the error current signals $|i_{1e}|$, $|i_{2e}|$, ..., $|i_{(n-1)e}|$ are altered by adjusting a reference voltage $u_r$ and the current references $i_{i1r}$, $i_{i2r}$, ... $i_{i(n-1)r}$, or adjusting a feedback voltage $u_{of}$ and feedback currents $i_{i1f}$, $i_{i2f}$, ..., $i_{i(n-1)f}$, thereby altering the modulation degrees $m_1$, $m_2$, ..., $m_n$. Therefore, the output voltages and the output currents (output powers) of the inverter can be adjusted and stabilized.

As shown in FIGS. 16-19, the $n^{th}$ path of input sources is designed as an input current feedback to control the input current to form the energy management control strategy of the input current instantaneous feedback bipolar, or the unipolar SPWM maximum power output. The current reference signals $I_{i1r}$, $I_{i2r}$, ..., $I_{inr}$ obtained by respectively performing MPPT on the $1^{st}$, $2^{nd}$, ... $n^{th}$ paths of the input current feedback signals of the inverter $I_{i1f}$, $I_{i2f}$, ..., $I_{inf}$ along with the $1^{st}$, $2^{nd}$, ... $n^{th}$ paths of input source are compared and amplified by a PI controller. The error amplified signals $I_{1e}$, $I_{2e}$, ..., $I_{ne}$ are respectively multiplies by the sinusoidal synchronizing signal and pass through the absolute value circuit 1, 2, ..., n to obtain $|i_{1e}|$, $|i_{2e}|$, ..., $|i_{ne}|$. The $|i_{1e}|$, $|i_{2e}|$, ..., $|i_{ne}|$ respectively cross with the sawtooth carrier wave, while it is considered to output the voltage gating signal, and then pass through the proper combinational logic circuits to obtain the power switch control signals $u_{gss1}$, $u_{gss2}$, ..., $u_{gssn}$, $u_{gs1}$, $u_{gs2}$, $u_{gs3}$, $u_{gs4}$.

Figure 17:
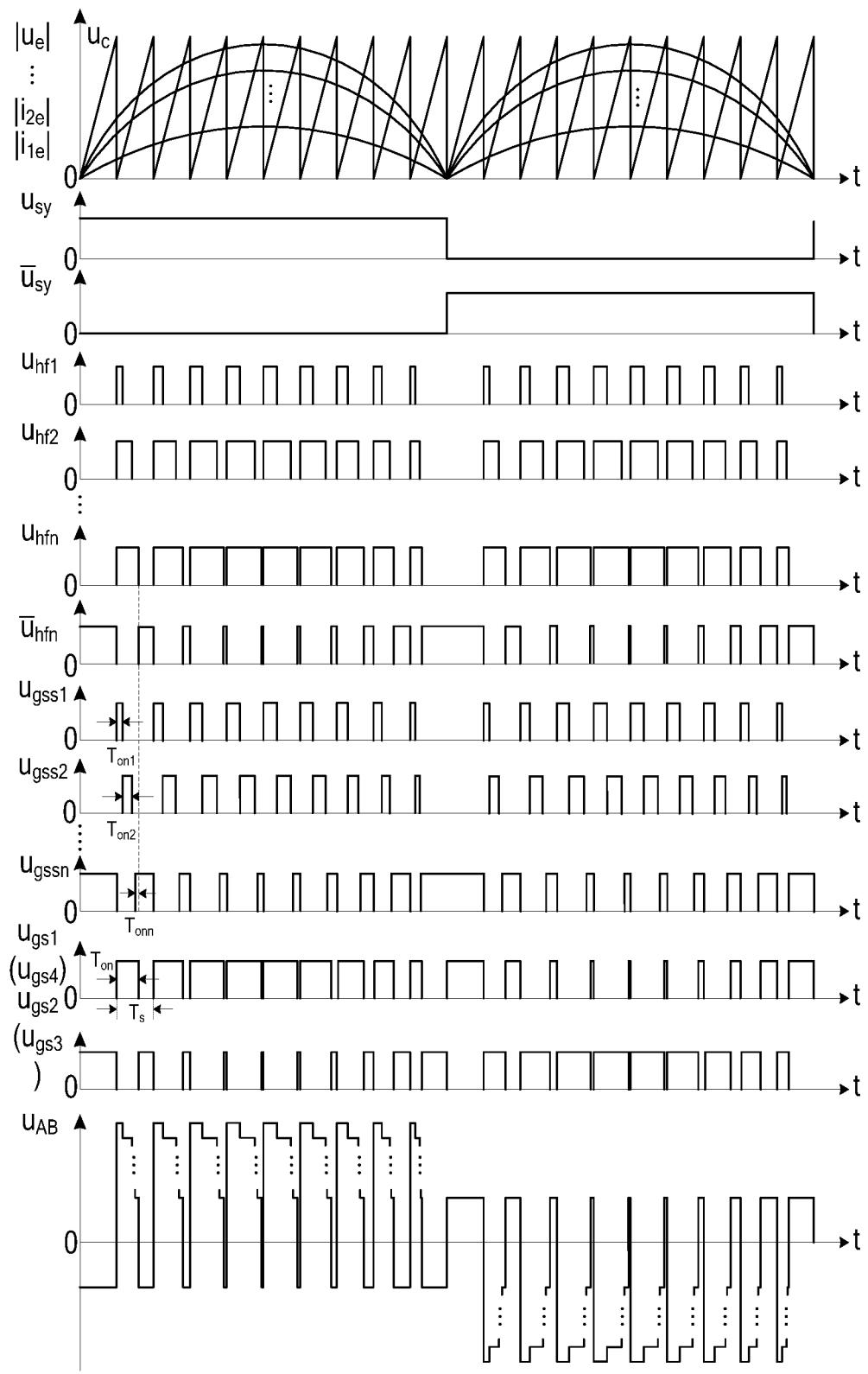
FIG. 17 is a schematic oscillogram of the energy management control showing the instantaneous output voltage and input current feedback bipolar SPWM master-slave power distribution of the single-stage multi-input buck type low-frequency link's inverter with an external parallel-timesharing select switch.
Figure 18:
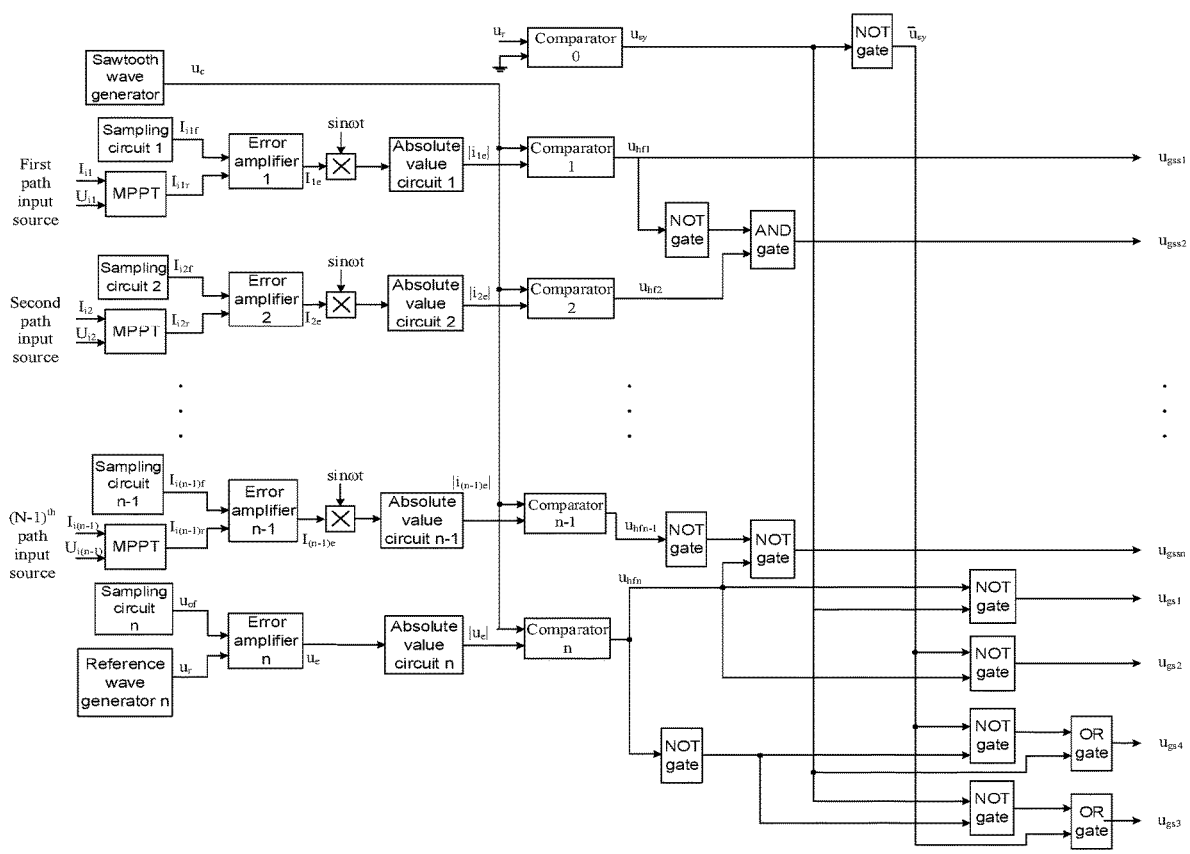
FIG. 18 is a block diagram of energy management control showing an instantaneous output voltage and input current feedback unipolar SPWM master-slave power distribution of the single-stage multi-input buck type low-frequency link's inverter with an external parallel-timesharing select switch.
Figure 19:
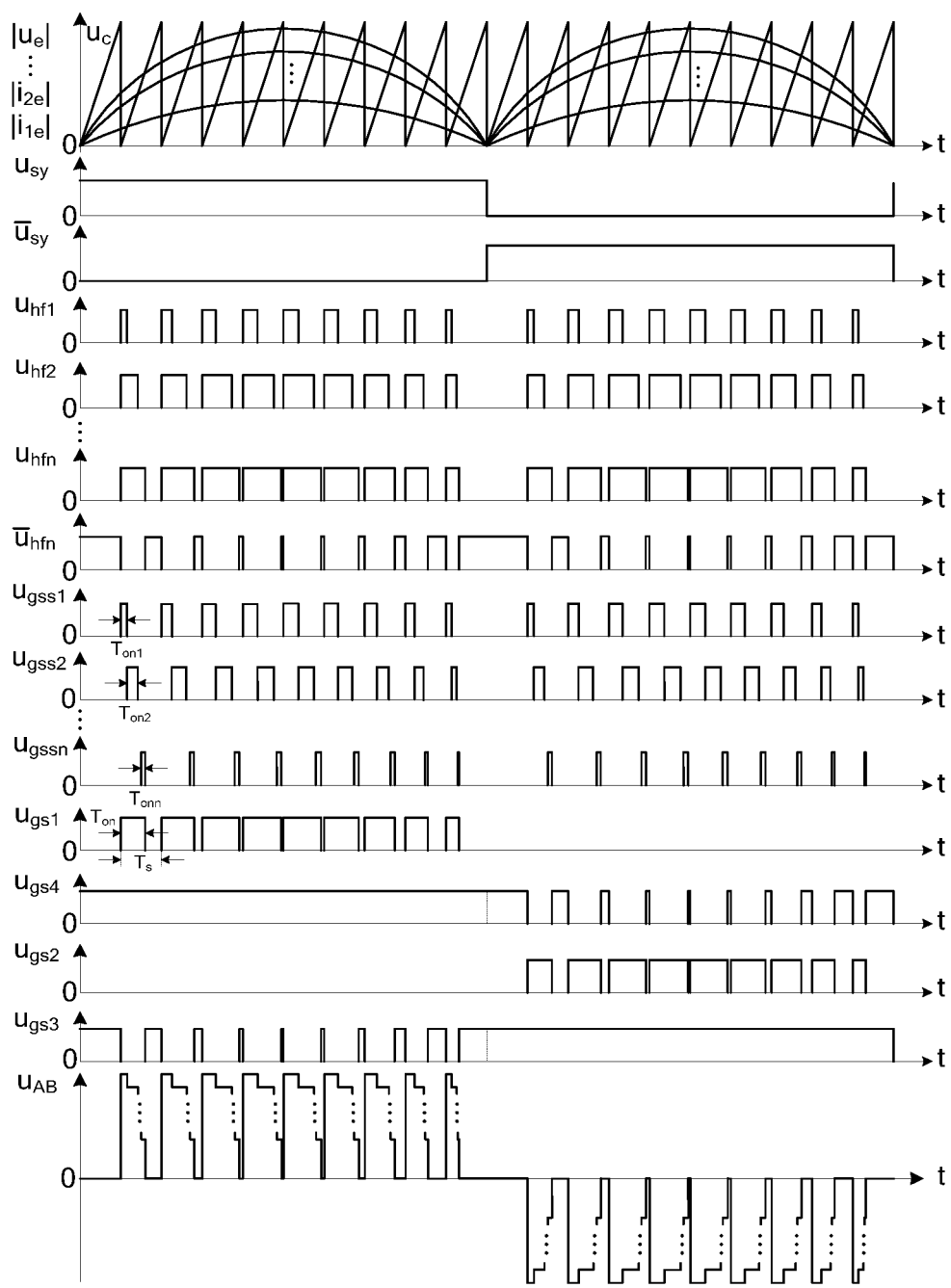
FIG. 19 is a schematic oscillogram of the energy management control showing the instantaneous output voltage and input current feedback unipolar SPWM master-slave power distribution of the single-stage multi-input buck type low-frequency link's inverter with an external parallel-timesharing select switch.

As shown in FIG. 17 and FIG. 19, the bipolar and unipolar SPWM control principal waveforms indicate the high-frequency switching period Ts, the turn-on time $T_{on1}$, $T_{on2}$, ..., $T_{onn}$ of the $1^{st}$, $2^{nd}$, ... $n^{th}$ paths of the input sources in a certain high-frequency switching period Ts, and the total turn-on time $T_{on}=T_{on1}+T_{on2}+\ldots+T_{onn}$. The total turn-on time $T_{on}$ varies sinusoidally in an output voltage period. Additionally, as for the H-bridge circuits I, II, and III shown in FIGS. 10, 11, and 12, a half of each input AC voltage value ($U_{i1}/2$, $U_{i2}/2$, ..., $U_{in}/2$) should be substituted into an equation of a voltage transfer ratio for calculation.

Figure 20:
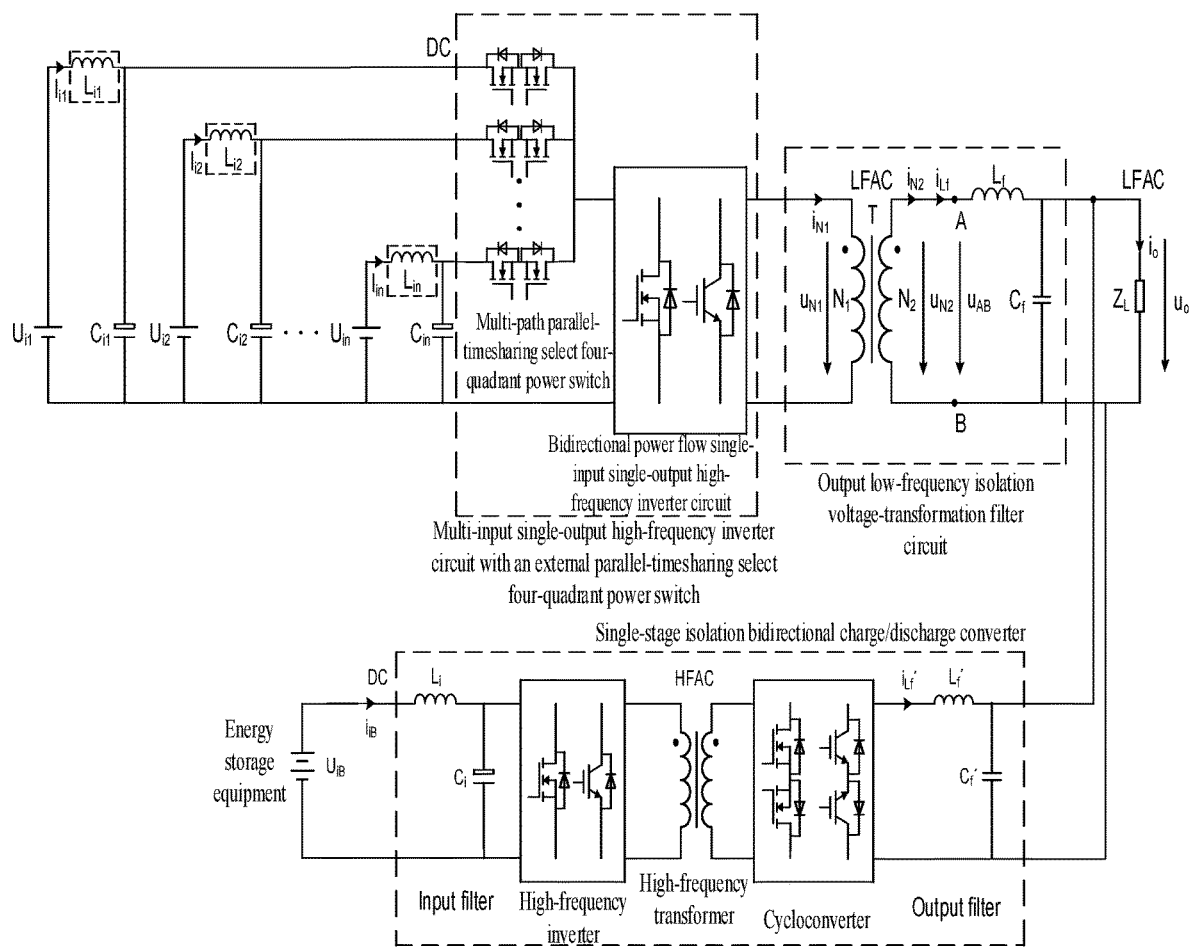
FIG. 20 is a diagram of the single-stage multi-input buck type low-frequency link's independent power supply system with an external parallel-timesharing select switch, having the output end connected in parallel to a single-stage isolation bidirectional charge/discharge converter.

In order to form the independent power supply system capable of making full use of energy of the multi-input sources, a plurality of input sources should work in the maximum power input mode and needs to be equipped with the energy storage equipment to realize the stability of the output voltage, namely the output end of the inverter is connected in parallel to one single-stage isolation bidirectional charge/discharge converter, as shown in FIG. 20. The single-stage isolation bidirectional charge/discharge converter is composed of the input inverter ($L_i$ and $C_i$, or $C_i$), the high-frequency inverter, the high-frequency transformer, the cycloconverter, and the output filter, which are successively connected in cascade. The cycloconverter is composed of the four-quadrant high-frequency power switch capable of withstanding the bidirectional voltage stress and the bidirectional current stress. When the single-stage isolation bidirectional charge/discharge converter is performing a forward energy transfer (discharging of the energy storage equipment) and a backward energy transfer (charging of the energy storage equipment), the single-stage isolation bidirectional charge/discharge converter is respectively equivalent to a single-stage high-frequency link DC-AC converter or a single-stage high-frequency link AC-DC converter.

Figure 21:
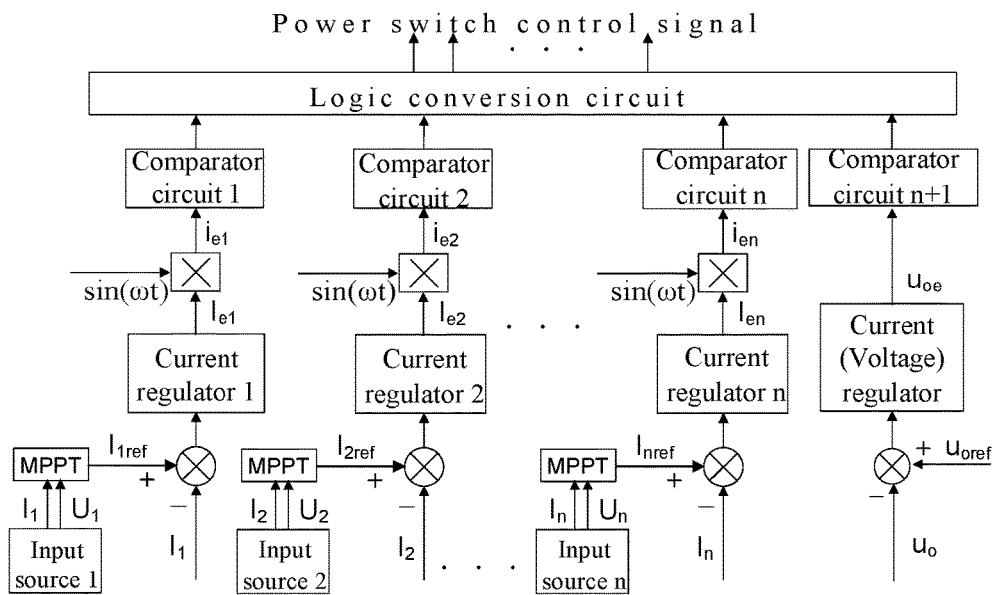
FIG. 21 shows an energy management control strategy of a maximum power output of an output voltage independent control loop circuit having the single-stage isolation bidirectional charge/discharge converter.
Figure 22:
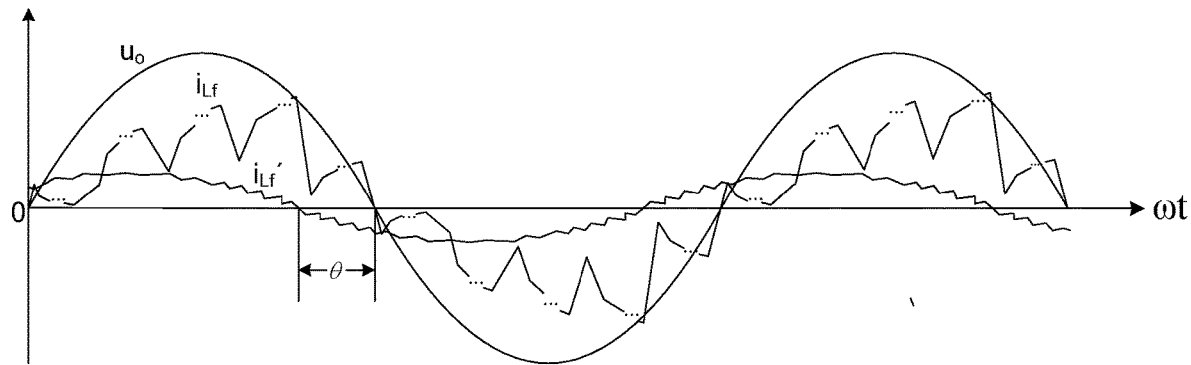
FIG. 22 is an oscillogram of an output voltage $u_o$ of the independent power supply system and electric currents hi and iii' of an output filter inductor.

The independent power supply system employs the energy management control strategy of the maximum power output of a single-stage multi-input high-frequency link's inverter output voltage independent control loop circuit. When a load power expressed as $P_o=U_oI_o$ is larger than a sum of maximum powers $P_{1max}+P_{2max}+\ldots+P_{nmax}$ of a plurality of the input sources, the energy storage equipment such as the accumulator and the supercapacitor supply the shortage of the power for the load through the single-stage isolation bidirectional charge/discharge converter (i.e. in power supply mode II, or the energy equipment individually supplies the load with the electric power, i.e. power supply mode III, which is an extreme case of the power supply mode II.). When a load power $P_o=U_oI_o$ is lower than the sum of the maximum powers $P_{1max}+P_{2max}+\cdots+P_{nmax}$ of a plurality of the input sources, the rest of the energy output by the plurality of input sources is supplied to charge the energy storage equipment through the single-stage isolation bidirectional charge/discharge converter (i.e. the power supply mode I.). Taking a resistive load as an example, a power flow direction control of the single-stage isolation bidirectional charge/discharge converter is illustrated hereinafter and is shown in FIG. 22. As for the output filter capacitor $C_f$, $C_f'$ and the load $Z_L$, a parallel connection of the output end of the single-stage multi-input buck type low-frequency link's inverter with an external parallel-timesharing select switch and the output end of single-stage isolation bidirectional charge/discharge converter is equivalent to a parallel superposition of two electric current sources. As the energy management control strategy shown in FIG. 21, it can be known that an output filter inductor electric current $i_{Lf}$ of the single-stage multi-input buck type low-frequency link's inverter with an external parallel-timesharing select switch and the output voltage $u_o$ have the same frequency and the same phase, and output the active power. The charge/discharge converter is controlled through an SPWM signal generated by crossing the error amplified signal $u_{oe}$ of the output voltage $u_o$ and the voltage reference $u_{oref}$ with the high-frequency carrier wave. There is a phase difference $\theta$ between the output filter inductor electric current $i_{Lf}'$ of the charge/discharge converter and $u_o$. Different phase differences $\theta$ are indicative of outputting the active power of different magnitudes and directions. When $P_o=P_{1max}+P_{2max}+\ldots+P_{nmax}$, $\theta=90°$ and the active power output by the charge/discharge converter are zero, the charge/discharge converter is in a no-load state. When $P_o>P_{1max}+P_{2max}+\ldots+P_{nmax}$, $u_o$ decreases and $\theta<90°$. The charge/discharge converter outputs the active power and the energy storage equipment supplies power to the load. Therefore, the energy storage equipment supplies the shortage of the power needed by the load. When $P_o<P_{1max}+P_{2max}+\ldots+P_{nmax}$, $u_o$ increases and $\theta>90°$. The charge/discharge converter outputs a minus active power and the load feeds back energy to the energy storage. Therefore, the rest of the power of the plurality of input sources is supplied to charge the energy storage equipment. When $\theta=180°$, the energy fed back to the energy storage equipment by the load is maximum. Therefore, the energy management control strategy can control the magnitude and direction of the power flow of the single-stage isolation bidirectional charge/discharge converter in real time according to the relative magnitude of $P_o$ and $P_{1max}+P_{2max}+\ldots+P_{nmax}$, which realizes that the system can smoothly and seamlessly switch between three power supply modes.

What is claimed is:

1. A single-stage multi-input buck type low-frequency link's inverter with an external parallel-timesharing select switch, comprising: a plurality of input filters connected to a ground, a common output low-frequency isolation voltage-transformation filter circuit and a multi-input single-output high-frequency inverter circuit, wherein the plurality of input filters and the common output low-frequency isolation voltage-transformation filter circuit are connected by the multi-input single-output high-frequency inverter circuit; each input end of the multi-input single-output high-frequency inverter circuit is connected to an output end of each input filter in a manner of one-to-one correspondence; an output end of the multi-input single-output high-frequency inverter circuit is connected to an input end of a low-frequency transformer of the output low-frequency isolation voltage-transformation filter circuit, or an input end of an output filter inductor, wherein the input end of an output filter inductor is not connected to the low-frequency transformer, or the input end of an output filter; the multi-input single-output high-frequency inverter circuit comprises an external multi-path parallel-timesharing select four-quadrant power switch circuit and a bidirectional power flow single-input single-output high-frequency inverter circuit successively connected in cascade; the multi-input single-output high-frequency inverter circuit is equivalent to the bidirectional power flow single-input single-output high-frequency inverter circuit; each path of the external multi-path parallel-timesharing select four-quadrant power switch circuit comprises only one four-quadrant power switch and output ends of all paths of the external multi-path parallel-timesharing select four-quadrant power switch circuit are connected in parallel; the output low-frequency isolation voltage-transformation filter circuit comprises the low-frequency transformer and the output filter connected successively in cascade, or comprises the output filter inductor, the low-frequency transformer and an output filter capacitor connected successively in cascade, or comprises the output filter and the low-frequency transformer connected successively in cascade; the multi-input single-output high-frequency inverter circuit of the single-stage multi-input buck type low-frequency link's inverter modulates the multi-path input DC voltage source $U_{i1}, U_{i2}, \ldots, U_{im}$ into a bipolar two-state multi-level SPWM voltage wave or a unipolar three-state multi-level SPWM voltage wave, wherein an amplitude of the bipolar two-state multi-level SPWM voltage wave or the unipolar three-state multi-level SPWM voltage wave varies with variation of the input DC voltage; the bipolar two-state multi-level SPWM voltage wave or the unipolar three-state multi-level SPWM voltage wave passes through the low-frequency transformer and an output LC filter, or through the output filter inductor, the low-frequency transformer, and the output filter capacitor, or through the output filter inductor, the output filter capacitor, and the low-frequency transformer, to obtain a high-quality sinusoidal AC voltage or sinusoidal AC current on a single-phase AC passive load or a single-phase AC power grid, wherein n represents a path number of a plurality of input sources and n is a natural number more than 1; a circuit topology of the single-stage multi-input buck type low-frequency link's inverter comprises a push-pull circuit, a push-pull forward circuit, a half-bridge circuit, or a full-bridge circuit, wherein each of the push-pull circuit, the push-pull forward circuit, and the half-bridge circuit comprises n four-quadrant high-frequency power switches for withstanding bidirectional voltage stress and bidirectional current stress and two two-quadrant high-frequency power switches for withstanding unidirectional voltage stress and the bidirectional current stress, the full-bridge circuit comprises n four-quadrant high-frequency power switches for withstanding bidirectional voltage stress and bidirectional current stress and four two-quadrant high-frequency power switches for withstanding unidirectional voltage stress and the bidirectional current stress; an independent power supply system formed by the single-stage multi-input buck type low-frequency link's inverter employs an energy management control strategy of an instantaneous output voltage and input current feedback bipolar SPWM or unipolar SPWM master-slave power distribution, wherein output powers of $1^{nd}, 2^{nd}, \ldots n-1^{th}$ paths of input sources are fixed and a shortage of power needed by a load is supplied by the $n^{th}$ path of input sources; a grid-tied power generating system formed by the single-stage multi-input buck type low-frequency link's inverter employs an energy management control strategy of an input current instantaneous feedback bipolar SPWM or unipolar SPWM maximum power output of the $1^{st}$, $2^{nd}$, ... $n^{th}$ paths of input sources; the single-stage multi-input buck type low-frequency link's inverter converts a plurality of connected-to-ground and unstable input DC voltages into a stable high-quality output AC needed by the load through a single-stage low-frequency isolation; the plurality of input sources supply electric power to the load simultaneously in a high-frequency switching period, or the plurality of input sources supply the electric power to the load in a time-sharing manner in the high-frequency switching period.

2. The single-stage multi-input buck type low-frequency link's inverter with the external parallel-timesharing select switch according to claim 1, wherein an output end of the single-stage multi-input buck type low-frequency link's inverter with the external parallel-timesharing select switch is connected in parallel to a single-stage isolation bidirectional charge/discharge converter of energy storage equipment to form the independent power supply system with a stable output voltage, and the independent power supply system is configured to make full use of energy of the plurality of input sources; the single-stage isolation bidirectional charge/discharge converter comprises the input filter, a high-frequency inverter, a high-frequency transformer, a cycloconverter and an output filter successively connected in cascade; the cycloconverter comprises a four-quadrant power switch for withstanding bidirectional voltage stress and bidirectional electric current stress; the independent power supply system employs the energy management control strategy of the maximum power output of a single-stage multi-input high-frequency link's inverter output voltage independent control loop circuit a plurality of input sources work in a maximum power outputting mode; a magnitude and a direction of a power flow of the single-stage isolation bidirectional charge/discharge converter are controlled by comparing a load power with a sum of maximum powers of the plurality of input sources in real time, to realize a smooth and seamless switch between a case of stabilizing a system output voltage and a case of charging/discharging of the energy storage equipment when a load power is larger than a sum of maximum powers of the plurality of input sources, the independent power supply system works in a second power supply mode where the energy storage equipment supplies the shortage of power for the load through the single-stage isolation bidirectional charge/discharge converter; a third power supply mode where the energy equipment individually supplies the load with the electric power is an extreme case of the second power supply mode; when the load power is lower than the sum of the maximum powers of the plurality of the input sources, the independent power supply system works in a first power supply mode where the rest of energy output by the plurality of input sources is supplied to charge the energy storage equipment through the single-stage isolation bidirectional charge/discharge converter; a current of the output filter inductor of the single-stage multi-input buck type low-frequency link's inverter and the output voltage have the same frequency and the same phase, and output an active power; the single-stage isolation bidirectional charge/discharge converter is controlled through an SPWM signal generated by crossing the error amplified signal of the output voltage and the voltage reference with the high-frequency carrier wave, and there is a phase difference $\theta$ between the current of the output filter inductor of the single-stage isolation bidirectional charge/discharge converter and the output voltage, wherein different phase differences $\theta$ are indicative of outputting the active power of different magnitudes and directions; when the load power is equal to the sum of the maximum powers of the plurality of the input sources, $\theta=90°$ and the active power output by the single-stage isolation bidirectional charge/discharge converter are zero; when the load power is larger than the sum of the maximum powers of the plurality of the input sources, the output voltage decreases, $\theta<90°$, the single-stage isolation bidirectional charge/discharge converter outputs the active power, and the energy storage equipment supplies the shortage of power needed by the load; when the load power is smaller than the sum of the maximum powers of the plurality of the input sources, the output voltage increases, $\theta>90°$, the single-stage isolation bidirectional charge/discharge converter outputs a minus active power, and the rest of the power of the plurality of input sources is supplied to charge the energy storage equipment.

\* \* \* \* \*